United States Patent
Sanneck et al.

(10) Patent No.: US 10,397,812 B2
(45) Date of Patent: Aug. 27, 2019

(54) SUB-CELL LEVEL, MULTI-LAYER DEGRADATION DETECTION, DIAGNOSIS AND RECOVERY

(75) Inventors: Henning Sanneck, Munich (DE); Peter Szilagyi, Budapest (HU); Christoph Frenzel, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 386 days.

(21) Appl. No.: 14/387,920

(22) PCT Filed: Mar. 26, 2012

(86) PCT No.: PCT/EP2012/055282
§ 371 (c)(1),
(2), (4) Date: Sep. 25, 2014

(87) PCT Pub. No.: WO2013/143572
PCT Pub. Date: Oct. 3, 2013

(65) Prior Publication Data
US 2015/0017975 A1    Jan. 15, 2015

(51) Int. Cl.
*H04W 36/00* (2009.01)
*H04W 24/08* (2009.01)
(Continued)

(52) U.S. Cl.
CPC ............ *H04W 24/08* (2013.01); *H04W 16/32* (2013.01); *H04W 64/003* (2013.01); *H04W 84/045* (2013.01)

(58) Field of Classification Search
CPC ....... H04W 88/02; H04W 4/02; H04W 88/06; H04W 92/02; H04W 76/02; H04W 24/00;
(Continued)

(56) References Cited

U.S. PATENT DOCUMENTS

| | | | |
|---|---|---|---|
| 8,509,762 B2 * | 8/2013 | Li | H04W 24/04 455/422.1 |
| 8,526,299 B2 * | 9/2013 | Ni | H04W 24/04 370/221 |

(Continued)

OTHER PUBLICATIONS

International Search Report and Written Opinion dated Sep. 28, 2012 corresponding to International Patent Application No. PCT/EP2012/055282.

(Continued)

*Primary Examiner* — Dai Phuong
(74) *Attorney, Agent, or Firm* — Squire Patton Boggs (US) LLP

(57) ABSTRACT

Outage detection and recovery in heterogeneous networks may benefit from sub-cell level, multi-layer degradation detection, diagnosis, and recovery. For example, cell outage detection and cell outage compensation may benefit from appropriate use of sub-cell level and multi-layer diagnosis and recovery techniques applied to degradation and outage scenarios. A method can include self-healing at least one first cell in a network or at least one second cell in the network. The network includes the at least one first cell and the at least one second cell. The at least one first cell and the at least one second cell have at least partially overlapping coverage. The self-healing can include a network device, such as a network management device, applying at least one of multi-layer reasoning to integrate information of different cell layers or sub-cell level reasoning to consider fine-granular location information. The self-healing can be based on location information.

17 Claims, 13 Drawing Sheets

(51) Int. Cl.
  *H04W 16/32* (2009.01)
  *H04W 64/00* (2009.01)
  *H04W 84/04* (2009.01)

(58) Field of Classification Search
  CPC ..... H04W 24/08; H04W 16/18; H04W 24/06;
        H04W 36/30; H04L 12/2697
  USPC .......... 455/418–423, 436–453, 456.1–456.3;
        370/329–334
  See application file for complete search history.

(56) References Cited

U.S. PATENT DOCUMENTS

| | | | | |
|---|---|---|---|---|
| 8,712,403 | B2* | 4/2014 | Deng | H04W 24/02 370/338 |
| 8,805,385 | B2* | 8/2014 | Hunukumbure | H04W 36/22 455/447 |
| 2011/0028181 | A1* | 2/2011 | Byun | H04W 36/0085 455/525 |
| 2011/0268044 | A1 | 11/2011 | Yun et al. | |
| 2012/0082064 | A1* | 4/2012 | Awoniyi | H04W 24/10 370/255 |
| 2012/0208522 | A1* | 8/2012 | Marklund | H04W 24/08 455/422.1 |
| 2013/0035033 | A1* | 2/2013 | Sanneck | H04W 24/04 455/9 |
| 2013/0084858 | A1* | 4/2013 | Ramasamy | H04W 48/16 455/434 |
| 2013/0095842 | A1* | 4/2013 | Jia | H04W 28/16 455/452.1 |
| 2013/0225177 | A1* | 8/2013 | Wegmann | H04W 36/0088 455/437 |
| 2013/0237266 | A1* | 9/2013 | Futaki | H04W 24/02 455/509 |
| 2013/0244669 | A1* | 9/2013 | Das | H04W 24/02 455/446 |
| 2014/0308951 | A1* | 10/2014 | Chang | H04W 24/04 455/423 |

OTHER PUBLICATIONS

Schmelz et al., "FP7 ICT-Socrates. Algorithms for Self-Configuration and Self-Healing," Workshop FP7 ICT-Socrates, Jun. 9, 2009, pp. 1-20, XP007915665, retrieved from URL:http://www.fp7-socrates.org/files/workshop1/socrates%20workshop%20Santander_Christoph%20Schmelz.pdf.
3GPP TR 32.835 V0.0.2 (Oct. 2011), Technical Report, 3rd Generation Partnership Project; Technical Specification Group Services and System Aspects; Telecommunication management; Study of Heterogeneous Networks Management (Release 11), Nov. 3, 2001, pp. 1-7, XP050554416.
Huawei: "Potential Solutions for Self Healing," 3GPP Draft; R3-120128, 3GPP TSG-RAN WG3 #75, Dresden, Germany, Jan. 30, 2012, XP050566499. 3 pages.
Huawei et al., "Clarification of Self-Healing at RAN," 3GPP Draft; R3-112773, 3GPP TSG RAN WG3 Meeting #74, San Francisco, US, Nov. 4, 2011, XP050566014, 3 pages.
NGMN Alliance / NGMN Top OPE Recommendations 1.0, http://www.ngmn.org/uploads/media/NGMN_Top_OPE_Recommendations_1.0.pdf / Sep. 21, 2010.
3GPP TR 36.805 V9.0.0 3rd Generation Partnership Project; Technical Specification Group Radio Access Network; Study on Minimization of drive-tests in Next Generation Networks; (Release 9), Jan. 5, 2010.
3GPP TS 32.101 V10.0.0 (Sep. 2010), 3GPP, Technical Specification Group Services and System Aspects, Telecommunication management, Principles and high level requirements (Release 10).
4G Americas, "Self-Optimizing Networks: The Benefits of SON in LTE", http://www.4gamericas.org/documents/Self-Optimizing%20Networks-Benefits%20of%20SON%20in%20LTE-July%202011.pdf.
S. Hämmäläinen, H. Sanneck, C. Sartori (eds.), LTE Self-Organising Networks (SON)—Network Management Automation for Operational Efficiency, Wiley, 2012 (to appear), Chapter 6 Self-healing.
J. Ramiro, K. Hamied (eds.), Self-Organizing Networks Self-Planning, Self-Optimization and Self-Healing for GSM, UMTS and LTE, Wiley 2011, Chapter 6.
Amirijoo M. et al / Cell Outage Management in LTE Networks, Wireless communication systems, 2009 ISWCS 2009. 6th International Symposium on, IEEE, Sep. 7, 2009 pp. 600-604, XP031545160, ISBN: 978-1-4244-3584-5 the whole documents.
3GPP TS 32.541 V14.0.0 (Apr. 2017), 3rd Generation Partnership Project; Technical Specification Group Services and System Aspects; Telecommunication Management; Self-Organizing Networks (SON); Self-healing concepts and requirements; (Release 14) (at https://portal.3gpp.org/desktopmodules/Specifications/SpecificationDetails.aspx?specificationId=2052).
Yu Ma, et al., "A Dynamic Affinity Propagation Clustering Algorithm Based on MDT in Self-Healing Heterogeneous Networks", 2016, 6 pages, Department of Network Optimization and Management, China Unicorn Network Technology Research Institute, Beijing, China, Email:may28@chinaunicom.cn.
3GPP TSG-SA WG5 (Telecom Management), Meeting #78, Huawei, "Clarification on IPv6 Prefix for Served PDP/PDN Address", Aug. 22-26, 2011; Istanbul, Turkey, S5-112482, Change Request.
3GPP TSG-SA WG5 (Telecom Management), Meeting #78, Huawei, "Service Identifier Level Reporting", Aug. 22-26, 2011; Istanbul, Turkey, S5-112483, Change Request.
3GPP TSG-SA WG5 (Telecom Management), Meeting #78, China Unicom, "CR R10 32.422 Add PS Domain MDT Activation Procedure After UE Attach", Aug. 22-26, 2011; Istanbul, Turkey, S5-112500, Change Request.
3GPP TSG-SA WG5 (Telecom Management), Meeting #78, China Unicom, "CR R11 32.422 Add PS Domain MDT Activation Procedure After UE Attach", Aug. 22-26, 2011; Istanbul, Turkey, S5-112501, Change Request.
3GPP TSG-SA WG5 (Telecom Management), Meeting #78, ZTE, "Clarify the Description of Use Case 1", Aug. 22-26, 2011; Istanbul, Turkey, S5-112516.
3GPP TSG-SA5 (Telecom Management), SA5#78, ZTE, "Discuss Paper for Location Accuracy in UE Selection for MDT", Aug. 22-26, 2011; Istanbul, Turkey, S5-112518r1.
3GPP TSG SA WG5 (Telecom Management), Meeting #78, ZTE, "Add Device Capability (i.e., Location Accuracy of UE) into Trace Parameters for MDT", Aug. 22-26, 2011; Istanbul, Turkey, S5-112519r1, Change Request.
3GPP TSG SA WG5 (Telecom Management), Meeting #78, NEC, "pCR TR 32.834 Concurrency of Inter-RAT and LTE Energy Saving", Aug. 22-26, 2011; Istanbul, Turkey, S5-112526.
3GPP TSG-SA5 (Telecom Management), SA5#77, ZTE, "Feedback on NGMN NGCOR Consolidated Requirements v092", Aug. 22-26, 2011; Istanbul, Turkey, S5-112540.
Klaus Martiny et al., Aug. 4, 2011; NGMN Alliance, Project NGCOR, Next Generation Mobile Networks, "Liaison Statement for NGMN NGCOR to Standard Developing Organisations—Project NGCOR Update", 4 pages, S5-112551.
Klaus Martiny et al., Jul. 18, 2011; NGMN Alliance, Project NGCOR, Next Generation Mobile Networks, Draft "Liaison Statement for NGMN NGCOR to Standard Developing Organisations—Project NGCOR Update", 4 pages, S5-112551.
3GPP TSG SA WG5 (Telecom Management), Meeting #78, 3GPP SA WG5, "Feedback on NGMN NGCOR Consolidated Requirements v.092", Aug. 22-26, 2011; Istanbul, Turkey, S5-112552.
3GPP TSG SA WG5 (Telecom Management), Meeting #78, 3GPP SA WG5, "Feedback on NGMN NGCOR Consolidated Requirements v.092", Aug. 22-26, 2011; Istanbul, Turkey, S5-112552r1.
3GPP TSG SA WG5 (Telecom Management), Meeting #78, 3GPP SA WG5, "Feedback on NGMN NGCOR Consolidated Requirements v.092", Aug. 22-26, 2011; Istanbul, Turkey, S5-112552r3.
3GPP TSG SA WG5 (Telecom Management), Meeting #78, 3GPP SA WG5, "Feedback on NGMN NGCOR Consolidated Requirements v.092", Aug. 22-26, 2011; Istanbul, Turkey, S5-112552r5.

(56) References Cited

OTHER PUBLICATIONS

3GPP TSG-SA WG3-LI Meeting #37, TPS, "H(e)NB LI Support", May 4-6, 2010; New York, USA, Document No. SA3L110_043r2, 4 pages, S5-112553.
3GPP SA WG3 LI Meeting #37, SA3-LI, "LS on H(e)NB Related LI Requirements", May 4-6, 2010; New York, USA, Document No. SA3L110_056r2, 1 page, S5-112553r2.
3GPP TSG-SA5 (Telecom Management), SA5#78, 3GPP TSG SA WG5, "Reply LS to BBF on Consistency of H(e)NB PM", Aug. 22-26, 2011; Istanbul, Turkey, S5-112554.
3GPP TSG-SA5 (Telecom Management), SA5#78, 3GPP TSG SA WG5, "Clarification for the Questions of the Integration of Performance Measurement Definitions", Aug. 22-26, 2011; Istanbul, Turkey, S5-112554_2.
3GPP TSG SA WG5 (Telecom Management), Meeting #78, 3GPP TSG SA WG5, "Management for Carrier Aggregation for LTE", Aug. 22-26, 2011; Istanbul, Turkey, S5-112555.
3GPP TSG SA WG5 (Telecom Management), Meeting #78, 3GPP TSG SA WG5, "LTE Self-Organizing Networks (SON) Coordination", Aug. 22-26, 2011; Istanbul, Turkey, S5-112556.
3GPP TSG SA WG5 (Telecom Management), Meeting #78, 3GPP TSG SA WG5, "LTE Self-Organizing Networks (SON) Coordination Management", Aug. 22-26, 2011; Istanbul, Turkey, S5-112556r.
3GPP TSG SA WG5 (Telecom Management), Meeting #78, 3GPP TSG SA WG5, "Network Management for 3GPP Interworking WLAN", Aug. 22-26, 2011; Istanbul, Turkey, S5-112557.
3GPP TSG SA WG5 (Telecom Management), Meeting #78, 3GPP TSG SA WG5, "Network Management for 3GPP Interworking WLAN", Aug. 22-26, 2011; Istanbul, Turkey, S5-112557r1.
3GPP TSG SA WG5 (Telecom Management), Meeting #78, Nokia Siemens Networks, "Align the HNB-GW Discovery Procedure with Flow Diagram", Aug. 22-26, 2011; Istanbul, Turkey, S5-112558, Change Request.
3GPP TSG SA WG5 (Telecom Management), Meeting #78, Nokia Siemens Networks, "Align the HNB-GW Discovery Procedure with Flow Diagram", Aug. 22-26, 2011; Istanbul, Turkey, S5-112559, Change Request.
3GPP TSG SA WG5 (Telecom Management), Meeting #78, Nokia Siemens Networks, "Align the HNB-GW Discovery Procedure with Flow Diagram", Aug. 22-26, 2011; Istanbul, Turkey, S5-112560, Change Request.
3GPP TSG SA WG5 (Telecom Management), Meeting #78, Nokia Siemens Networks, "Add the Root CA Certificate Pre-Configuration to the Discovery Procedures", Aug. 22-26, 2011; Istanbul, Turkey, S5-112561, Change Request.
3GPP TSG SA WG5 (Telecom Management), Meeting #78, Nokia Siemens Networks, "Add the Root CA Certificate Pre-Configuration to the Discovery Procedures", Aug. 22-26, 2011; Istanbul, Turkey, S5-112562, Change Request.
3GPP TSG SA WG5 (Telecom Management), Meeting #78, Nokia Siemens Networks, "Editorial Cleanup of Serving HeMS Discovery Procedure", Aug. 22-26, 2011; Istanbul, Turkey, S5-112563, Change Request.
3GPP TSG SA WG5 (Telecom Management), Meeting #78, Nokia Siemens Networks, "Add the Root CA Certificate Pre-Configuration to the Discovery Procedures", Aug. 22-26, 2011; Istanbul, Turkey, S5-112564, Change Request.
3GPP TSG SA WG5 (Telecom Management), Meeting #78, Nokia Siemens Networks, "Add the Root CA Certificate Pre-Configuration to the Discovery Procedures", Aug. 22-26, 2011; Istanbul, Turkey, S5-112565, Change Request.
3GPP TSG SA WG5 (Telecom Management), Meeting #78, Nokia Siemens Networks, "Distinguish Trigger in MRO Measurements of Too Late Handovers", Aug. 22-26, 2011; Istanbul, Turkey, S5-112566, Change Request.
3GPP TSG SA WG5 (Telecom Management), Meeting #78, Nokia Siemens Networks, "Add PM for Inter-RAT MRO", Aug. 22-26, 2011; Istanbul, Turkey, S5-112567, Change Request.

3GPP TSG SA WG5 (Telecom Management), Meeting #78, Huawei, Ericsson, "Introducing ANR Concepts and Requirements for UTRAN", Aug. 22-26, 2011; Istanbul, Turkey, S5-112568, Change Request.
3GPP TSG SA WG5 (Telecom Management), Meeting #78, China Mobile, "Addition of Measurements Related to Direct User Plane Path Between HNB and LGW", Aug. 22-26, 2011; Istanbul, Turkey, S5-112569, Change Request.
3GPP TSG SA WG5 (Telecom Management), Meeting #78, China Mobile, "Addition of Measurements Related to Direct User Plane Path Between HeNB and LGW", Aug. 22-26, 2011; Istanbul, Turkey, S5-112570, Change Request.
3GPP TSG-SA5 (Telecom Management), Meeting SA5#78, Ericsson, "Minutes of Breakout Session on NGCOR Requirements Response", Aug. 22-26, 2011; Istanbul, Turkey, S5-112571.
3GPP TSG SA WG5 (Telecom Management), Meeting #78, ZTE, "Add the Attribute nbrOfSubframesRNAllowedList for DeNBCapability", Aug. 22-26, 2011; Istanbul, Turkey, S5-112572, Change Request.
3GPP TSG SA WG5 (Telecom Management), Meeting #78, ZTE, "Correct CDIV Related Measurement", Aug. 22-26, 2011; Istanbul, Turkey, S5-112573, Change Request.
3GPP TSG SA WG5 (Telecom Management), Meeting #78, ZTE, "Add CW Related Measurement", Aug. 22-26, 2011; Istanbul, Turkey, S5-112575, Change Request.
3GPP TSG SA WG5 (Telecom Management), Meeting #78, ZTE, "Add HOLD Related Measurement", Aug. 22-26, 2011; Istanbul, Turkey, S5-112576, Change Request.
3GPP TSG SA WG5 (Telecom Management), Meeting #78, ZTE, "Add CB and ACR Related Measurement", Aug. 22-26, 2011; Istanbul, Turkey, S5-112577, Change Request.
3GPP TSG SA WG5 (Telecom Management), Meeting #78, ZTE, "Correct HSS Related Measurement", Aug. 22-26, 2011; Istanbul, Turkey, S5-112578, Change Request.
3GPP TSG SA WG5 (Telecom Management), Meeting #78, ZTE, "Add ECSCFFunction IMS NRM", Aug. 22-26, 2011; Istanbul, Turkey, S5-112579, Change Request.
3GPP TSG SA WG5 (Telecom Management), Meeting #78, ZTE, "Add ECSCFFunction IMS NRM", Aug. 22-26, 2011; Istanbul, Turkey, S5-112580, Change Request.
3GPP TSG SA WG5 (Telecom Management), Meeting #78, ZTE, "Correct Emergency Session Related Measurements", Aug. 22-26, 2011; Istanbul, Turkey, S5-112581, Change Request.
3GPP TSG SA WG5 (Telecom Management), Meeting #78, NGMN NGCOR Comments, Comments and Questions for Clarification, 2 pages, Aug. 22-26, 2011; Istanbul, Turkey, S5-112585.
3GPP TSG SA WG5 (Telecom Management), Meeting #78, Huawei, Corrections on Some Data Type Definitions, Aug. 22-26, 2011; Istanbul, Turkey, S5-112586.
3GPP TSG SA WG5 (Telecom Management), Meeting #78, Ericsson, "Revised WID on UTRAN Self-Organizing Networks (SON) Management—Revision", Aug. 22-26, 2011; Istanbul, Turkey, S5-112587.
TSG-S14#65 Meeting, Aug. 15-19, 2011, Kista, Sweden, TSG SA WG4, "LS on Radio Metrics With Respect to QoE", TDoc S4-11080, 1 page, S5-112588.
3GPP TSG SA WG5 (Telecom Management) Meeting #78, ZTE, "Add Requirement for UTRAN Handover", Aug. 22-26, 2011; Istanbul, Turkey, S5-112589, Change Request.
3GPP TSG SA WG5 (Telecom Management) Meeting #78, ZTE, "Add Requirements for UTRAN ANR", Aug. 22-26, 2011; Istanbul, Turkey, S5-112590, Change Request.
3GPP TSG SA WG5 (Telecom Management) Meeting #78, SA5, "Reply LS to C3-111217 on the Work Split Between SA5 and CT3 for QoS Control Based on Subscriber Spending Limits (Rel-11 QoS_SSL)", Aug. 22-26, 2011; Istanbul, Turkey, S5-112591.
3GPP TSG SA WG5 (Telecom Management) Meeting #78, 3GPP TSG SA WG5, "LS Reply to CT1 on Transit-IOI Scenarios", Aug. 22-26, 2011; Istanbul, Turkey, S5-112592.
3GPP TSG SA WG5 (Telecom Management) Meeting #78, Alcatel-Lucent, "Example SpIM for Preferred Currency", Aug. 22-26, 2011; Istanbul, Turkey, S5-112593.
3GPP TSG SA WG5 (Telecom Management) Meeting #78, Alcatel-Lucent, "Example SpIM for User Name", Aug. 22-26, 2011; Istanbul, Turkey, S5-112594.

(56) References Cited

OTHER PUBLICATIONS

3GPP TSG SA WG5 (Telecom Management) Meeting #78, Alcatel-Lucent, "Example SpIM heading for Study on UDC Info-", Aug. 22-26, 2011; Istanbul, Turkey, (Revision of S5-112304) S5-112595.
3GPP TSG SA WG5 (Telecom Management) Meeting #78, Alcatel-Lucent, "Application Data for AIM Level EPS", Aug. 22-26, 2011; Istanbul, Turkey, (Revision of S5-112300) S5-112596.
3GPP TSG SA WG5 (Telecom Management) Meeting #78, Alcatel-Lucent, "Application Data for AIM IMS MMTel", Aug. 22-26, 2011; Istanbul, Turkey, (Revision for S5-112301) S5-112597.
3GPP TSG SA WG5 (Telecom Management) Meeting #78, Alcatel-Lucent, "Application Data for AIM IMS CSCF", Aug. 22-26, 2011; Istanbul, Turkey, (Revision for S5-112303) S5-112599.
3GPP TSG SA WG5 (Telecom Management) Meeting #78, Alcatel-Lucent, "Application Data Section Heading", Aug. 22-26, 2011; Istanbul, Turkey, (Revision of S5-112307) S5-112600.
3GPP TSG SA WG5 (Telecom Management) Meeting #78, Alcatel-Lucent, "Application Data for AIM Level CS/GPRS", Aug. 22-26, 2011; Istanbul, Turkey, (Revision of S5-112299) S5-112601.
3GPP TSG SA WG5 (Telecom Management) Meeting #78, Alcatel-Lucent, "Correction on PDN Connection Identifier for Charging", Aug. 22-26, 2011; Istanbul, Turkey, (Revision of S5-112281) S5-112602.
3GPP TSG SA WG5 (Telecom Management) Meeting #78, Alcatel-Lucent, "Correction on Charging Identifiers Description", Aug. 22-26, 2011; Istanbul, Turkey, (Revision of S5-11xyzw) S5-112603.
3GPP TSG SA WG5 (Telecom Management) Meeting #78, Alcatel-Lucent, "Solve Editors Note on Charging Id", Aug. 22-26, 2011; Istanbul, Turkey, (Revision of S5-112285) S5-112604.
3GPP TSG SA WG5 (Telecom Management) Meeting #78, Alcatel-Lucent, "Solve Editors Note on Charging Id", Aug. 22-26, 2011; Istanbul, Turkey, (Revision of S5-112286) S5-112605.
3GPP TSG SA WG5 (Telecom Management) Meeting #78, Alcatel-Lucent, "Solve Editors Note on Charging Id", Aug. 22-26, 2011; Istanbul, Turkey, (Revision of S5-112297) S5-112606.
3GPP TSG-SA5 (Telecom Management) SA5#78, Nokia Siemens Networks, "Correction on pdpPDNtype for PGW", Aug. 22-26, 2011; Istanbul, Turkey, (Revision of S5-112409) S5-112607.
3GPP TSG-SA5 (Telecom Management) SA5#78, Nokia Siemens Networks, "Correction on pdpPDNtype for PGW", Aug. 22-26, 2011; Istanbul, Turkey, (Revision of S5-112410) S5-112608.
3GPP TSG-SA5 (Telecom Management) SA5#78, Nokia Siemens Networks, "Correction on pdpPDNtype for PGW", Aug. 22-26, 2011; Istanbul, Turkey, (Revision of S5-112411) S5-112609.
3GPP TSG SA WG5 (Telecom Management) Meeting #78, Nokia Siemens Networks, "Add Missing Measurements for Unnecessary HOs for Inter-Rat MRO", Aug. 22-26, 2011; Istanbul, Turkey, (Revision of S5-112343) S5-112610.
3GPP TSG SA WG5 (Telecom Management) Meeting #78, ZTE, "Add Service Request Procedure Related Measurements", Aug. 22-26, 2011; Istanbul, Turkey, (Revision of S5-112352) S5-112611.
3GPP TSG SA WG5 (Telecom Management) Meeting #78, SA5, "LS to SA2 on PDP/PDN Address Definition", Aug. 22-26, 2011; Istanbul, Turkey, (Revision of S5-xxxxxx) S5-112612.
3GPP TSG SA WG5 (Telecom Management) Meeting #78, ZTE, "Add the Mean Delay and Mean Delay Jitter on LU Interface", Aug. 22-26, 2011; Istanbul, Turkey, (Revision of S5-112355) S5-112614.
3GPP TSG SA WG5 (Telecom Management) Meeting #78, ZTE, "Add the Mean Delay and Mean Delay Jitter on Nb Interface", Aug. 22-26, 2011; Istanbul, Turkey, (Revision of S5-112356) S5-112615.
3GPP TSG SA WG5 (Telecom Management) Meeting #78, ZTE, "Correct the Number of Subscribers in VLR", Aug. 22-26, 2011; Istanbul, Turkey, (Revision of S5-112357) S5-112616.
3GPP TSG SA WG5 (Telecom Management) Meeting #78, ZTE, "Add Number of Handover Intra MSC-S Related Measurements", Aug. 22-26, 2011; Istanbul, Turkey, (Revision of S5-112358) S5-112617.
3GPP TSG SA WG5 (Telecom Management) Meeting #78, China Mobile, "Addition of Lucslink and Alink Related MT MO Calls and Traffic Measurements", Aug. 22-26, 2011; Istanbul, Turkey, (Revision of S5-112469) S5-112618.
3GPP TSG SA WG5 (Telecom Management) Meeting #78, China Mobile, "Addition of IP-Can Session Establishment Related Measurements", Aug. 22-26, 2011; Istanbul, Turkey, (Revision of S5-112467) S5-112619.
3GPP TSG SA WG5 (Telecom Management) Meeting #78, Huawei, "Correction to Charging ID in WLAN-CDR Content", Aug. 22-26, 2011; Istanbul, Turkey, (Revision of S5-112474) S5-112620.
3GPP TSG SA WG5 (Telecom Management) Meeting #78, Huawei, "Correction to Charging ID in WLAN-CDR Content", Aug. 22-26, 2011; Istanbul, Turkey, (Revision of S5-112475) S5-112621.
3GPP TSG SA WG5 (Telecom Management) Meeting #78, Huawei, "Correction to Charging ID in WLAn-CDR Content", Aug. 22-26, 2011; Istanbul, Turkey, (Revision of S5-112476) S5-112622.
3GPP TSG SA WG5 (Telecom Management) Meeting #78, Alcatel-Lucent, "Correction on MT-LR CDR—Alignment with TS 23.271", Aug. 22-26, 2011; Istanbul, Turkey, (Revision of S5-112289) S5-112626.
3GPP TSG SA WG5 (Telecom Management) Meeting #78, Alcatel-Lucent, "Correction on MT-LR CDR—Alignment with TS 23.271", Aug. 22-26, 2011; Istanbul, Turkey, (Revision of S5-112290) S5-112627.
3GPP TSG SA WG5 (Telecom Management) Meeting #78, ZTE, "Add Mean Number of Activated PDP Contexts With Direct Tunnel Related Measurements", Aug. 22-26, 2011; Istanbul, Turkey, (Revision of S5-112353) S5-112628.
3GPP TSG SA WG5 (Telecom Management) Meeting #78, Openet, "Correction to Fix Misalignment with TS 23.203", Aug. 22-26, 2011; Istanbul, Turkey, (Revision of S5-112320) S5-112629.
3GPP TSG SA WG5 (Telecom Management) Meeting #78, ZTE, "Add S4 Data Volume Related Measurements", Aug. 22-26, 2011; Istanbul, Turkey, (Revision of S5-112503) S5-112630.
3GPP TSG SA WG5 (Telecom Management) Meeting #78, ZTE, "Add S12 Data Volume Related Measurements", Aug. 22-26, 2011; Istanbul, Turkey, (Revision of S5-112504) S5-112631.
3GPP TSG-SA5 (Telecom Management) SA5#78, Nokia Siemens Networks, "Correction on ASN.1 Source Code", Aug. 22-26, 2011; Istanbul, Turkey, (Revision of S5-112413) S5-112632.
3GPP TSG SA WG5 (Telecom Management) Meeting #78, Ericsson, "Correction for Dynamic Address Flags Associated to PDN Connection of PDP/PDN type IPv4v6", Aug. 22-26, 2011; Istanbul, Turkey, (Revision of S5-112375) 55-112633.
3GPP TSG SA WG5 (Telecom Management) Meeting #78, Ericsson, "Correction of asn.1 Definition", Aug. 22-26, 2011; Istanbul, Turkey, (Revision of S5-11xyzw) S5-112634.
3GPP TSG-SA5 (Telecom Management) SA5#78, Nokia Siemens Networks, "Correction on AVP Definition—Align with IETF RFC 3588", Aug. 22-26, 2011; Istanbul, Turkey, (Revision of S5-112405) S5-112635.
3GPP TSG-SA5 (Telecom Management) SA5#78, Nokia Siemens Networks, "Correction on AVP Definition—Align with IETF RFC 3588", Aug. 22-26, 2011; Istanbul, Turkey, (Revision of S5-112406) S5-112636.
3GPP TSG-SA5 (Telecom Management) SA5#78, Nokia Siemens Networks, "Correction on AVP Definition—Align with IETF RFC 3588", Aug. 22-26, 2011; Istanbul, Turkey, (Revision of S5-112407) S5-112637.
3GPP TSG SA WG5 (Telecom Management) Meeting #78, Ericsson, "Alignment of the Occurrence Condition for IMSI with TS 32.251", Aug. 22-26, 2011; Istanbul, Turkey, (Revision of S5-112384) S5-112638.
3GPP TSG SA WG5 (Telecom Management) Meeting #78, Ericsson, "Alignment of the Occurrence Condition for IMSI with TS 32.251", Aug. 22-26, 2011; Istanbul, Turkey, (Revision of S5-112385) S5-112639.
3GPP TSG SA WG5 (Telecom Management) Meeting #78, Ericsson, "Correction of the Release/Version Identifier in CDR File Header Format", Aug. 22-26, 2011; Istanbul, Turkey, (Revision of S5-112386) S5-112640.
3GPP TSg-SA5 (Telecom Management) SA5#78, Nokia Siemens Networks, "Correction on AVP Definition—Align with IETF RFC 3588", Aug. 22-26, 2011; Istanbul, Turkey, (Revision of S5-112408) S5-112641.
3GPP TSG SA WG5 (Telecom Management) Meeting #78, SA5, "LS on Charging at ePDG and 3GPP AAA in non-3GPP access to EPC Architecture", Aug. 22-26, 2011; Istanbul, Turkey, (Revision of S5-11xyzw) S5-112642.

(56) References Cited

OTHER PUBLICATIONS

3GPP TSG-SA5 (Telecom Management), SWG-OAM Executive Report, Aug. 22-26, 2011; Istanbul, Turkey, S5-112205.
3GPP TSG-SA5 (Telecom Management), SWG-OAM Executive Report, Aug. 22-26, 2011; Istanbul, Turkey, S5-112205, Change Request.
3GPP TSG-SA5 (Telecom Management), SA5#78, CH Agenda and Time Plan, Aug. 22-26, 2011; Istanbul, Turkey, S5-112207r1.
3GPP TSg-SA5 (Telecom Management), SA5#78, CH Agenda and Time Plan, Aug. 22-26, 2011; Istanbul, Turkey, S5-112207r2.
3GPP TSG-SA5 (Telecom Management), SA5#78, SWG-CH Executive Report, Aug. 22-26, 2011; Istanbul, Turkey, S5-112210.
3GPP TSG-SA5 (Telecom Management), SA5#78, SWG-CH Executive Report, Aug. 22-26, 2011; Istanbul, Turkey, S5-112210r1.
3GPP TSG-SA5, Detailed Meeting Report for TSG SA WG5CH, Meeting: 78, Istanbul, Turkey, Aug. 22, 2011 to Aug. 26, 2011, S5-112211.
3GPP TSG-SA5 (Telecom Management), SA5#78, Ericsson, Alarm Correlation and Root Cause Analysis Session Agenda, Aug. 22-26, 2011; Istanbul, Turkey, S5-112222r1.
3GPP TSG-SA5 (Telecom Management), SA5#78, Ericsson, "Enhanced Management of UE Based Network Performance Measurements", Aug. 22-26, 2011; Istanbul, Turkey, S5-112225r1.
3GPP TSG-SA5 (Telecom Management), SA5#78, Ericsson, "Enhanced Management of UE Based Network Performance Measurements", Aug. 22-26, 2011; Istanbul, Turkey, S5-112225r2.
3GPP TSG-SA5 (Telecom Management), SA5#78, Nokia Siemens Networks, "Session Agenda Study on OAM Aspects of Inter-RAT Energy Saving", Aug. 22-26, 2011; Istanbul, Turkey, S5-112231.
3GPP TSG-SA5 (Telecom Management), SA5#78, Leaders Meeting Agenda, Aug. 22-26, 2011; Istanbul, Turkey, S5-112233.
3GPP TSG-SA5 (Telecom Management), SA5#78, Ericsson, "510041 Alarm Correlation and Root Cause Analysis OAM Rapporteur", Aug. 22-26, 2011; Istanbul, Turkey, S5-112235.
3GPP TSG-SA5 (Telecom Management), Nokia Siemens Networks, "UID_510056n IRP Framework Enhancements to Support Management of Converged Networks Rapporteur Report", Aug. 22-26, 2011; Istanbul, Turkey, S5-112236.
3GPP TSG-SA5 (Telecom Management), ZTE, "UID_510056, IMS Performance Management Enhancement, OAM Rapporteur Report", Aug. 22-26, 2011; Istanbul, Turkey, S5-112237.
3GPP TSG-SA5 (Telecom Management), ZTE, "UID_510056, IMS Performance Management Enhancement, OAM Rapporteur Report", Aug. 22-26, 2011; Istanbul, Turkey, S5-112237r1.
3GPP TSG-SA5 (Telecom Management), SA5#78, Ericsson, "Enhanced Management of UE Based Network Performance Measurements (510058) Rapporteur Report", First Draft, Aug. 22-26, 2011; Istanbul, Turkey, S5-112238.
3GPP TSG-SA5 (Telecom Management), SA5#78, Ericsson, "Enhanced Management of UE Based Network Performance Measurements (510058) Rapporteur Report", First Draft, Aug. 22-26, 2011; Istanbul, Turkey, S5-1122380.
3GPP TSG-SA5 (Telecom Management), Meeting #78, China Mobile, "UID_520034 CN Performance Measurements Enhancement Rapporteur Report", Aug. 22-26, 2011; Istanbul, Turkey, S5-112239.
3GPP TSG-SA5 (Telecom Management), SA5#78, Huawei, "UID_510059 Utran Self-Organizing Netowrks (SON) Management Rapporteur Report", Aug. 22-26, 2011; Istanbul, Turkey, S5-112240.
3GPP TSG-SA5 (Telecom Management), SA5#78, Ericsson, "UID_470050 Study on Version Handling OAM Rapporteur Report", Aug. 22-26, 2011; Istanbul, Turkey, S5-112241.
3GPP TSG-SA5 (Telecom Management), Meeting #78, Nokia Siemens Networks, "UID_480047 Study on Management of Converged Networks Rapporteur Report", Aug. 22-26, 2011; Istanbul, Turkey, S5-112242.
3GPP TSG-SA5 (Telecom Management), Meeting #78, Alcatel-Lucent, "UID_490039, Study on UDC Information Handling and Provisioning Rapporteur Report", Aug. 22-26, 2011; Istanbul, Turkey, S5-112243.
3GPP TSG-SA5 (Telecom Management), SA5#78, Nokia Siemens Networks, "UID_510045 Study on OAM Aspects of Inter-RAT Energy Saving Rapporteur Report", Aug. 22-26, 2011; Istanbul, Turkey, S5-112244.
3GPP TSG-SA5 (Telecom Management), Meeting #78, Ericsson, "UID_510046 Study on Management of Heterogeneous Networks Rapporteur Report", Aug. 22-26, 2011; Istanbul, Turkey, S5-112245.
3GPP TSG-SA5 (Telecom Management), SA5#78, SA5 Chairman, "Leaders Meeting Minutes", Aug. 22-26, 2011; Istanbul, Turkey, S5-112246.
3GPP TSG-SA5 (Telecom Management), Meeting #78, TeliaSonera, "Activating MDT in home operator that uses more than one PLMN", Aug. 22-26, 2011; Istanbul, Turkey, S5-112366.
3GPP TSG-SA5 (Telecom Management), SA5#78, Ericsson, "Change Direction of Notifications in SOAP Solution", Aug. 22-26, 2011; Istanbul, Turkey, S5-112393, Change Request.
3GPP TSG-SA5 (Telecom Management), SA5#78, Ericsson, "Change Direction of Notifications in SOAP Solution", Aug. 22-26, 2011; Istanbul, Turkey, S5-112394, Change Request.
3GPP TSG-SA5 (Telecom Management), SA5#78, Ericsson, "Change Direction of Notifications in SOAP Solution", Aug. 22-26, 2011; Istanbul, Turkey, S5-112395, Change Request.
3GPP TSG-SA5 (Telecom Management), SA5#78, ZTE, "Adding Sponsor Identity and Application Service Provider dentifier AVPs in the Offline Charging Message", Aug. 22-26, 2011; Istanbul, PR China, S5-112424, Change Request.
3GPP TSG-SA5 (Telecom Management), SA5#78, ZTE, "Adding Sponsor Identity and Application Service Provider dentifier AVPs in the Offline Charging Message", Aug. 22-26, 2011; Istanbul, PR China, S5-112426, Change Request.
3GPP TSG-SA5 (Telecom Management), SA5#78, ZTE, "Adding Sponsor Identity and Application Service Provider dentifier AVPs in the Offline Charging Message", Aug. 22-26, 2011; Istanbul, PR China, S5-112428, Change Request.
3GPP TSG-SA5 (Telecom Management), Meeting #78, Huawei, "Correction on the Support Condition of Attribute CellIndividualOffset", Aug. 22-26, 2011; Istanbul, Turkey, S5-112437, Change Request.
3GPP TSG-SA5 (Telecom Management), Meeting #78, Huawei, "Corrections on Some Data Type Definitions", Aug. 22-26, 2011; Istanbul, Turkey, S5-112438, Change Request.
3GPP TSG-SA5 (Telecom Management), Meeting #78, Huawei, "Identify Business Level Requirements for Inter-RAT Energy Saving", Aug. 22-26, 2011; Istanbul, Turkey, S5-112453.
3GPP TSG-SA5 (Telecom Management), SA5#78, Huawei, "Consideration on NGMN NGCOR Requirements", Aug. 22-26, 2011; Istanbul, Turkey, S5-112455.
3GPP TSG-SA5 (Telecom Management), Meeting #77, Intel, "Inter-RAT Energy Saving Requirements", Aug. 22-26, 2011; Istanbul, Turkey, S5-112457.
3GPP TSG-SA5 (Telecom Management), Meeting #78, China Mobile, Potevio, "Correction on the Measurement Names in the KPI Definition of E-RAB Accessibility", Aug. 22-26, 2011; Istanbul, Turkey, S5-112465, Change Request.
3GPP TSG-SA5 (Telecom Management), Meeting #78, China Mobile, Potevio, "Correction on the Measurements Names in the KPI Definition of E-RAB Accessibility", Aug. 22-26, 2011; Istanbul, Turkey, S5-112466, Change Request.
3GPP TSG-SA5 (Telecom Management), Meeting #78, China Mobile, "Addition of IP-Can Session Establishment Related Measurements", Aug. 22-26, 2011; Istanbul, Turkey, S5-112467r1, Change Request.
3GPP TSG-SA5 (Telecom Management), SA5#78, Ericsson, "Add Missing References to Performance Measurements TSs and Remove Obsolete References. Add Missing Text Referring to LTE", Aug. 22-26, 2011; Istanbul, Turkey, S5-112473, Change Request.
3GPP TSG-SA5 (Telecom Management), Meeting #78, Huawei, "Correction to Charging ID in WLAN-CDR Content", Aug. 22-26, 2011; Istanbul, Turkey, S5-112474, Change Request.
3GPP TSG-SA5 (Telecom Management), Meeting #78, Huawei, "Correction to Charging ID in WLAN-CDR Content", Aug. 22-26, 2011; Istanbul, Turkey, S5-112475, Change Request.

(56) References Cited

OTHER PUBLICATIONS

3GPP TSG-SA5 (Telecom Management), Meeting #78, Huawei, "Correction to Charging ID in WLAN-CDR Content", Aug. 22-26, 2011; Istanbul, Turkey, S5-112476, Change Request.
3GPP TSG-SA5 (Telecom Management), Meeting #78, Huawei, "Correction to IPv6 Prefix", Aug. 22-26, 2011; Istanbul, Turkey, S5-112477, Change Request.
3GPP TSG-SA5 (Telecom Management), Meeting #78, Huawei, "Correction to IPv6 Prefix", Aug. 22-26, 2011; Istanbul, Turkey, S5-112478, Change Request.
3GPP TSG-SA5 (Telecom Management), Meeting #78, Huawei, "Correction to IPv6 Prefix", Aug. 22-26, 2011; Istanbul, Turkey, S5-112479, Change Request.
3GPP Tsg-SA5 (Telecom Management), Meeting #78, Huawei, "Clarification on IPv6 Prefix for Served PDP/PDN Address", Aug. 22-26, 2011; Istanbul, Turkey, S5-112480, Change Request.
3GPP TSG-SA5 (Telecom Management), Meeting #78, Huawei, "Clarification on IPv6 Prefix for Served PDP/PDN Address", Aug. 22-26, 2011; Istanbul, Turkey, S5-112481, Change Request.
3GPP TSG SA WG5 (Telecom Management) Meeting #78, Alcatel-Lucent, "Correction for IARI—Alignment with TS 24.229", Aug. 22-26, 2011, Istanbul, Turkey, (Revision of S5-112544) S5-112643.
3GPP TSG-SA5 (Telecom Management) SA5#78, Nokia Siemens Networks, "Correction on ASN.1 Source Code", Aug. 22-26, 2011, Istanbul, Turkey, (Revision of S5-xxyyww) S5-112644.
3GPP TSG-SA5 (Telecom Management) SA5#78, Nokia Siemens Networks, "Correction on ASN.1 Source Code", Aug. 22-26, 2011, Istanbul, Turkey, (Revision of S5-xxyyww) S5-112645.
3GPP TSG SA WG5 (Telecom Management) Meeting #78, Nokia Siemens Networks, "Inter-RAT Energy Saving Concept 2", Aug. 22-26, 2011, Istanbul, Turkey, (Revision of S5-112323) S5-112646.
3GPP TSG-SA5 (Telecom Management) SA5#78, Ericsson, "Proposed Candidate Solution for Inter-RAT ESM", Aug. 22-26, 2011, Istanbul, Turkey, (Revision of S5-112396) S5-112647.
3GPP TSG-SA5 (Telecom Management) SA5#78, Nokia Siemens Networks, "Correction on ASN.1 Definition", Aug. 22-26, 2011, Istanbul, Turkey, (Revision of S5-112412) S5-112648.
3GPP TSG SA WG5 (Telecom Management) Meeting #78, Huawei, "Identify Business Level Requirements for Inter-RAT Energy Saving", Aug. 22-26, 2011, Istanbul, Turkey, (Revision of S5-112453) S5-112649.
3GPP TSG SA WG5 (Telecom Management) Meeting #78, SA5, "Reply LS on CT3 Aspect of QoS Control Based on Subscriber Spending Limits", Aug. 22-26, 2011, Istanbul, Turkey, (Revision of S5-11xyzw) S5-112650.
3GPP TSG-SA5 (Telecom Management) SA5#78, SA5, "LS on Including Wi-Fi/LTE RAT Combination for Inter-RAT ESM", Aug. 22-26, 2011, Istanbul, Turkey, S5-112651.
3GPP TSG SA WG5 (Telecom Management) Meeting #78, Nokia Siemens Networks, Amdocs, Huawei, "Implication of Sy Reference Point on OCS Architecture", Aug. 22-26, 2011, Istanbul, Turkey, (Revision of S5-112542) S5-112652.
3GPP TSG SA WG5 (Telecom Management) Meeting #78, Huawei, Intel, "Discussion on load Measurements in Inter-RAT Energy Saving Management", Aug. 22-26, 2011, Istanbul, Turkey, (Revision of S5-112458) S5-112653.
3GPP TSG SA WG5 (Telecom Management) Meeting #78, Huawei, Ericsson, ZTE, "Addition of Sponsored Data Connectivity Charging—Align with TS 23.203", Aug. 22-26, 2011, Istanbul, Turkey, (Revision of S5-112493) S5-112654.
3GPP TSG SA WG5 (Telecom Management) Meeting #78, Huawei, Ericsson, ZTE, "Addition of Sponsored Data Connectivity Charging—Align with TS 23.203", Aug. 22-26, 2011, Istanbul, Turkey, (Revision of S5-112494) S5-112655.
3GPP TSG SA WG5 (Telecom Management) Meeting #78, Huawei, Ericsson, ZTE, "Addition of Sponsored Data Connectivity Charging—Align with TS 23.203", Aug. 22-26, 2011, Istanbul, Turkey, (Revision of S5-112495) S5-112656.

3GPP TSG-SA5 (Telecom Management) SA5#78, Nokia Siemens Networks, "Correction on RAT Type—Align with CT3 TS 29.061", Aug. 22-26, 2011, Istanbul, Turkey, S5-112658.
3GPP TSG SA WG5 (Telecom Management) Meeting #78, 3GPP SA WG5, "Feedback on NGMN "NGCOR Consolidated Requirements" V.092", Aug. 22-26, 2011, Istanbul, Turkey, (Revision of S5-112552r5) S5-112659.
3GPP TSG-SA5 (Telecom Management) SA5#77, 3GPP TSG SA WG5, "[DRAFT] Reply LS to NGMN NGCOR on Project NGCOR Update", May 9-13 2011, Shenzhen, P.R. China, S5-112660.
3GPP TSG-SA5 (Telecom Management) SA5#76, MCC, Huawei, "Adding TCE Address and TCe ID Mapping Information to ENBFunction", Feb. 28-Mar. 4, 2011, San Diego, USA, (Revision of S5-11449) S5-112661.
3GPP TSG-SA5 (Telecom Management) SA5#78, "QoS Control Based on Subscriber Spending Limits", Aug. 22-26, 2011, Istanbul, Turkey, S5-112662.
3GPP TSG SA WG5 (Telecom Management) Meeting #78, TeliaSonera, "MDT for Multiple PLMN IDs", Aug. 22-26, 2011, Istanbul, Turkey, (Revision of S5-112369) S5-112663.
3GPP TSG SA WG5 (Telecom Management) Meeting #78, TeliaSonera, "MDT for Multiple PLMN IDs", Aug. 22-26, 2011, Istanbul, Turkey, (Revision of S5-112369) S5-112664.
3GPP TSG SA WG5 (Telecom Management) Meeting #78, SA5, "LS to SA2 on PDP/PDN Address Definition", Aug. 22-26, 2011, Istanbul, Turkey, (Revision of S5-112612) S5-112665.
3GPP TSG-SA5 (Telecom Management) SA5#78, P.I.Works, "Enhancement for MDT Initiation with IMEI-TAC Usage", Aug. 22-26, 2011, Istanbul, Turkey, (Revision of S5-112549) S5-112666.
3GPP TSG-SA5 (Telecom Management) SA5#78, P.I.Works, "Correction in flow Chart for Area Based MDT Activation in E-UTRAN", Aug. 22-26, 2011, Istanbul, Turkey, (Revision of S5-11xyzw) S5-112667.
3GPP TSG-SA5 (Telecom Management) SA5#78, P.I.Works, "Correction in flow Chart for Area Based MDT Activation in E-UTRAN", Aug. 22-26, 2011, Istanbul, Turkey, (Revision of S5-112550) S5-112668.
3GPP TSG-SA5 (Telecom Management) SA5#78, 3GPP TSG SA WG5, "Reply LS to NGMN NGCOR on Project NGCOR Update", Aug. 22-26, 2011, Istanbul, Turkey, S5-112669.
3GPP TSG-SA5 (Telecom Management) SA5#78, 3GPP TSG SA WG5, "Reply LS to LS on Equivalent PLMN Identities and MDT", Aug. 22-26, 2011, Istanbul, Turkey, S5-112670.
3GPP TSG SA WG5 (Telecom Management) Meeting #78, Huawei, "Align the Use Consent Description with RAN3", Aug. 22-26, 2011, Istanbul, Turkey, (Revision of S5-112445) S5-112671.
3GPP TSG SA WG5 (Telecom Management) Meeting #78, Huawei, "MDT Measurement Alignment", Aug. 22-26, 2011, Istanbul, Turkey, (Revision of S5-112447) S5-112672.
3GPP TSG SA WG5 (Telecom Management) Meeting #78, Huawei, "MDT Measurement Alignment", Aug. 22-26, 2011, Istanbul, Turkey, (Revision of S5-11448) S5-112673.
3GPP TSG SA WG5 (Telecom Management) Meeting #78, Huawei, "Add MDT Location correlation Requirements", Aug. 22-26, 2011, Istanbul, Turkey, (Revision of S5-112440), S5-112474, S5-112674.
3GPP TSG SA WG5 (Telecom Management) Meeting #78, SA5, "Reply LS on CT3 Aspect of QoS Control Based on Subscriber Spending Limits", Aug. 22-26, 2011, Istanbul, Turkey, (Revision of S5-112650) S5-112675.
3GPP TSG SA WG5 (Telecom Management) Meeting #78, ZTE, "Correct Definition of rootCauseIndicator of IDL Specification", Aug. 22-26, 2011, Istanbul, Turkey, (Revision of S5-112513) S5-112676.
3GPP TSG-SA5 (Telecom Management) SA5#78, Ericsson, "Add Concepts for Alarm Correlation and Root Cause Analysis", Aug. 22-26, 2011, Istanbul, Turkey, S5-112677.
3GPP TSG-SA5 (Telecom Management) SA5#78, Ericsson, "Add Concepts for Alarm Correlation and Root Cause Analysis", Aug. 22-26, 2011, Istanbul, Turkey, S5-112677r1, Change Request.
3GPP TSG SA WG5 (Telecom Management) Meeting #78, Huawei, "Align the Use Consent Description with RAN3", Aug. 22-26, 2011, Istanbul, Turkey, (Revision of S5-11xxxx) S5-112678.

(56) References Cited

OTHER PUBLICATIONS

3GPP TSG-SA5 (Telecom Management) Meeting SA5#78, Ericsson, "Adding Requirements for MDT Positioning", Aug. 22-26, 2011, Istanbul, Turkey, (Resubmission of S5-112425) S5-112679, Change Request.

3GPP TSG SA WG5 (Telecom Management) Meeting #78, China Unicorn, "Add PS Domain MDT Activation procedure After UE Attach", Aug. 22-26, 2011, Istanbul, Turkey, (Revision of S5-112500) S5-112680.

3GPP TSG SA WG5 (Telecom Management) Meeting #78, China Unicorn, "Add PS Domain MDT Activation procedure After UE Attach", Aug. 22-26, 2011, Istanbul, Turkey, (Revision of S5-112501) S5-112681.

3GPP TSG-SA5 (Telecom Management) Meeting SA5#78, Alcatel-Lucent, "Cleanup Text Forpropagation of Immediate MDT for Inter MME Scenario", Aug. 22-26, 2011, Istanbul, Turkey, (Resubmission of S5-112541) S5-112682, Change Request.

3GPP TSG-SA5 (Telecom Management) Meeting #78, Huawei, "Add MDT Location Correlation Requirements", Aug. 22-26, 2011, Istanbul, Turkey, (Revision of S5-112674) S5-112683, Change Request.

3GPP TSG-SA5 (Telecom Management) Meeting #78, TeliaSonera, "RAI/LAI in MDT Area Scope", Aug. 22-26, 2011, Istanbul, Turkey, (Revision of S5-112365) S5-112684, Change Request.

3GPP TSG-SA5 (Telecom Management) Meeting #78, TeliaSonera, "RAI in MDT/LAI Area Scope", Aug. 22-26, 2011, Istanbul, Turkey, (Revision of S5-112370) S5-112685, Change Request.

3GPP TSG SA WG5 (Telecom Management) Meeting #78, Alcatel-Lucent, "Application Data Section Heading", Aug. 22-26, 2011, Istanbul, Turkey, (Revision of S5-112600) S5-112686.

3GPP TSG SA WG5 (Telecom Management) Meeting #78, Alcatel-Lucent, "Application Data for AIM Level CS/GPRS", Aug. 22-26, 2011, Istanbul, Turkey, (Revision of S5-112601) S5-112687.

3GPP TSG SA WG5 (Telecom Management) Meeting #78, Alcatel-Lucent, "Application Data for AIM Level EPS", Aug. 22-26, 2011, Istanbul, Turkey, (Revision of S5-112596) S5-112688.

3GPP TSG SA WG5 (Telecom Management) Meeting #78, Alcatel-Lucent, "Application Data for AIM IMS CSCF", Aug. 22-26, 2011, Istanbul, Turkey, (Revision of S5-112599) S5-112689.

3GPP TSG SA WG5 (Telecom Management) Meeting #78, Alcatel-Lucent, "Application Data for AIM IMS MMTel", Aug. 22-26, 2011, Istanbul, Turkey, (Revision of S5-112597) S5-112690.

3GPP TSG-SA5 (Telecom Management) Meeting #78, Huawei, TeliaSonera, Ericsson, Alcatel-Lucent, Nokia Siemens Networks, "Activating MDT in Home Operator That Uses More Than One PLMN", Aug. 22-26, 2011, Istanbul, Turkey (Revision of S5-112366) S5-112691, Change Request.

3GPP TSG-SA5 (Telecom Management) Meeting #78, Huawei, TeliaSonera, Ericsson, Alcatel-Lucent, Nokia Siemens Networks, "Activating MDT in Home Operator That Uses More Than One PLMN", Aug. 22-26, 2011, Istanbul, Turkey Revision of S5-112691) S5-112691r1, Change Request.

3GPP TSG SA WG5 (Telecom Management) Meeting #78, Huawei, "Align the User Consent Description with RAN3", Aug. 22-26, 2011, Istanbul, Turkey, (Revision of S5-112671), S5-112692.

3GPP TSG-SA5 (Telecom Management) SA5#78, MCC, Huawei, "Adding TCe Address and TCe ID Mapping Information to ENBFunction", Aug. 22-26, 2011; Istanbul, Turkey, (Revision of S5-112661) S5-112693.

3GPP TSG SA WG5 (Telecom Management) Meeting #78, 3GPP Work Item, "Management for Carrier Aggregation for LTE", Aug. 22-26, 2011, Istanbul, Turkey, (Revision of S5-112339), S5-112694.

3GPP TSG SA WG5 (Telecom Management) Meeting #78, 3GPP Work Item, "Management for Carrier Aggregation for LTE", Aug. 22-26, 2011, Istanbul, Turkey, (Revision of S5-112339), S5-112694r1.

3GPP TSG SA WG5 (Telecom Management) Meeting #78, Huawei, "Align the User Consent Description With RAN3", Aug. 22-26, 2011, Istanbul, Turkey, (Revision of S5-112678), S5-112695.

3GPP TSG SA WG5 (Telecom Management) Meeting #78, 3GPP Work Item, "Network Management for 3GPP Interworking WLAN", Aug. 22-26, 2011, Istanbul, Turkey, (Revision of S5-112557), S5-112696.

3GPP TSG SA WG5 (Telecom Management) Meeting #78, Ericsson, "Revised WID on UTRAN Self-Organizing networks (SON) Management—Revision of SP-110133", Aug. 22-26, 2011, Istanbul, Turkey, (Revision of S5-112325), S5-112587, S5-112697.

3GPP TSG-SA5 (Telecom Management) Meeting #78, Huawei, TeliaSonera, Ericsson, Alcatel-Lucent, Nokia Siemens Networks, "Activating MDT in home Operator that Uses More than One PLMN", Aug. 22-26, 2011; Istanbul, Turkey, (Revision of S5-112371) S5-112698.

3GPP TSG-SA5 (Telecom Management) Meeting #78, Huawei, TeliaSonera, Ericsson, Alcatel-Lucent, Nokia Siemens Networks, "Activating MDT in home Operator that Uses More than One PLMN", Aug. 22-26, 2011; Istanbul, Turkey, (Revision of S5-112698) S5-112698r1.

3GPP TSG-SA5 (Telecom Management) SA5#78, Nokia Siemens Networks, "Removal of Placeholder Duplication for ASN.1 Source Code", Aug. 22-26, 2011; Istanbul, Turkey, (Revision of S5-112644) S5-112699.

3GPP TSG-SA5 (Telecom Management) SA5#78, Nokia Siemens Networks, "Removal of Placeholder Duplication for ASN.1 Source Code", Aug. 22-26, 2011; Istanbul, Turkey, (Revision of S5-112645) S5-112700.

3GPP TSG-SA5 (Telecom Management) SA5#78, Nokia Siemens Networks, "Removal of Placeholder Duplication for ASN.1 Source Code", Aug. 22-26, 2011; Istanbul, Turkey, (Revision of S5-112632) S5-112701.

3GPP TSG-SA5 (Telecom Management) SA5#78, SA5, "LS on Including Wi-Fi/LTE RAT Combination for Inter-RAT ESM", Aug. 22-26, 2011; Istanbul, Turkey, S5-112702.

3GPP TSG SA WG5 (Telecom Management) Meeting #78, Huawei, TeliaSonera, Ericsson, Alcatel-Lucent, Nokia Siemens Networks, "Align the User Consent Description with RAN3 and Add Description on Activating MDT in Home Operator That Uses More Than One PLMN", Aug. 22-26, 2011, Istanbul, Turkey, (Revision of S5-11xxxx), S5-112703.

3GPP TSG SA WG5 (Telecom Management) Meeting #78, Huawei, TeliaSonera, Ericsson, Alcatel-Lucent, Nokia Siemens Networks, "Align the User Consent Description with RAN3 and Add Description on Activating MDT in Home operator That Uses More Than One PLMN", Aug. 22-26, 2011, Istanbul, Turkey, (Revision of S5-11xxxx), S5-112704.

3GPP TSG-SA5 (Telecom Management) SA5#78, 3GPP TSG SA WG5, "Clarification for the Questions of the Integration of Performance Measurement Definitions", Aug. 22-26, 2011; Istanbul, Turkey, S5-112705.

3GPP TSG-SA5 (Telecom Management) SA5#78, 3GPP TSG SA WG5, "Reply LS to BBF on Consistency of H(e)NB PM", Aug. 22-26, 2011; Istanbul, Turkey, S5-112705r1.

3GPP TSG-SA5 (Telecom Management) SA5#78, SA5, "LS on Including Wi-Fi/LTE RAT Combination for Inter-RAT ESM", Aug. 22-26, 2011; Istanbul, Turkey, S5-112706.

3GPP TSG-SA5 (Telecom Management) SA5#78, 3GPP TSG SA WG5, "DRAFT Reply LS to LS on Equivalent PLMN Identities and MDT", Aug. 22-26, 2011; Istanbul, Turkey, S5-112707.

3GPP TSG SA WG5 (Telecom Management) Meeting #78, 3GPP TSG SA WG5, "LTE Self-Organizing Networks (SON) Coordination Management", Aug. 22-26, 2011, Istanbul, Turkey, (Revision of S5-112556), S5-112708.

3GPP TSG SA WG5 (Telecom Management) Meeting #78, Huawei, TeliaSonera, Ericsson, Alcatel-Lucent, Nokia Siemens Networks, "Align the User Consent Description with RAN3 and Add Description on Activating MDT in Home Operator That Uses More Than One PLMN", Aug. 22-26, 2011, Istanbul, Turkey, (Revision of S5-112703), S5-112709.

3GPP TSG SA WG5 (Telecom Management) Meeting #78, Huawei, TeliaSonera, Ericsson, Alcatel-Lucent, Nokia Siemens Networks, "Align the User Consent Description with RAN3 and Add Descrip-

(56) References Cited

OTHER PUBLICATIONS tion on Activating MDT in Home Operator That Uses More Than One PLMN", Aug. 22-26, 2011, Istanbul, Turkey, (Revision of S5-112704), S5-112710.

3GPP TSG SA WG5 (Telecom Management) Meeting #78, 3GPP TSG SA WG5, "LTE Self-Organizing networks (SON) Coordination", Aug. 22-26, 2011, Istanbul, Turkey, (Revision of S5-112708), S5-112711.

3GPP TSG SA WG5 (Telecom Management) Meeting #78, SA5, "LS on Charging at ePDG and 3GPP AAA in non-3GPP Access to EPC Architecture", Aug. 22-26, 2011, Istanbul, Turkey, (Revision of S5-112642), S5-112712.

* cited by examiner

SUB-CELL LEVEL, MULTI-LAYER DEGRADATION DETECTION, DIAGNOSIS AND RECOVERY

BACKGROUND

Field

Outage detection, diagnosis, and recovery in heterogeneous networks may benefit from sub-cell level, multi-layer degradation detection, diagnosis, and recovery. For example, cell outage detection, cell outage diagnosis, and cell outage compensation may benefit from appropriate use of sub-cell level and multi-layer diagnosis and recovery techniques applied to degradation and outage scenarios.

Description of the Related Art

Cell outage detection and recovery methods may exist for the long term evolution (LTE) of the third generation partnership project (3GPP). Conventional cell outage detection does not, however, consider location information for performance management data, upon which degradation/outage detection is based.

Alarm correlating techniques also may exist, aimed at reducing the volume of alarm flow. The input for such conventional techniques is the alarms. The alarms, however, contain no detailed location information. Thus, these techniques cannot help to provide a more accurate diagnosis of the problem or improve recovery planning.

SUMMARY

A method according to certain embodiments includes self-healing at least one first cell in a network or at least one second cell in the network. The network includes the at least one first cell and the at least one second cell. The at least one first cell and the at least one second cell have at least partially overlapping coverage. The self-healing includes a network device applying at least one of multi-layer reasoning to integrate information of different cell layers or sub-cell level reasoning to consider fine-granular location information. The self-healing is based on location information.

A non-transitory computer readable medium, according to certain embodiments, is encoded with instructions that, when executed in hardware, perform a process. The process includes self-healing at least one first cell in a network or at least one second cell in the network. The network includes the at least one first cell and the at least one second cell. The at least one first cell and the at least one second cell have at least partially overlapping coverage. The self-healing includes a network device applying at least one of multi-layer reasoning to integrate information of different cell layers or sub-cell level reasoning to consider fine-granular location information. The self-healing is based on location information.

An apparatus, in certain embodiments, includes self-healing means for self-healing at least one first cell in a network or at least one second cell in the network. The network includes the at least one first cell and the at least one second cell. The at least one first cell and the at least one second cell have at least partially overlapping coverage. The self-healing means includes applying means for applying at least one of multi-layer reasoning to integrate information of different cell layers or sub-cell level reasoning to consider fine-granular location information. The self-healing is based on location information.

In certain embodiments, an apparatus includes at least one processor and at least one memory including computer program instructions. The at least one memory and the computer program instructions are configured to, with the at least one processor, cause the apparatus at least to self-heal at least one first cell in a network or at least one second cell in the network, and to apply at least one of multi-layer reasoning to integrate information of different cell layers or sub-cell level reasoning to consider fine-granular location information. The network includes the at least one first cell and the at least one second cell. The at least one first cell and the at least one second cell have at least partially overlapping coverage. The self-healing is based on location information.

BRIEF DESCRIPTION OF THE DRAWINGS

For proper understanding of the invention, reference should be made to the accompanying drawings, wherein.

DETAILED DESCRIPTION

Management tasks such as planning, initial configuration, optimization, troubleshooting can be performed using planning and monitoring tools. Automated ways of network management also exist, for example, Self-Organizing Networks (SON) can perform some management tasks automatically. The domains covered by SON include self-configuration, self-optimization and self-healing. Self-configuration can include auto-connectivity and initial as well as operational-time configuration of network elements. Self-optimization can include handling efficient resource allocation and automatically following the varying demand from subscribers and the changing environment. Self-healing can aim at detecting anomalies in the network, diagnosing faults, correlating/reducing alarms to improve alarm quality, automatically compute, and execute compensation and recovery actions. Thus, self-healing can generally refer to the overall process (including detection, diagnosis, and recovery/repair), or to any sub-set of the overall process (for example, only detection or only diagnosis or only diagnosis and recovery/repair).

Often, only cell outage detection (COD) and cell outage compensation (COC) are mentioned as SON self-healing use cases. However, in certain embodiments described herein, cell degradation detection (CDDe) and diagnosis (CDDi) are considered: both contain the outage case and the case that the cell is still able to provide a certain level of service but its performance is below the expected level by an amount clearly visible to the subscribers as well. That is, a cell outage is a special case of degradation meaning that the cell is unable to provide any acceptable service, often meaning that users are not able to connect to it and there is no traffic in the cell at all. Furthermore, this approach clearly analytically separates the detection, such as detecting relevant incidents in the network, and diagnosis functionality, such as identifying the root cause of an incident.

Figure 1:
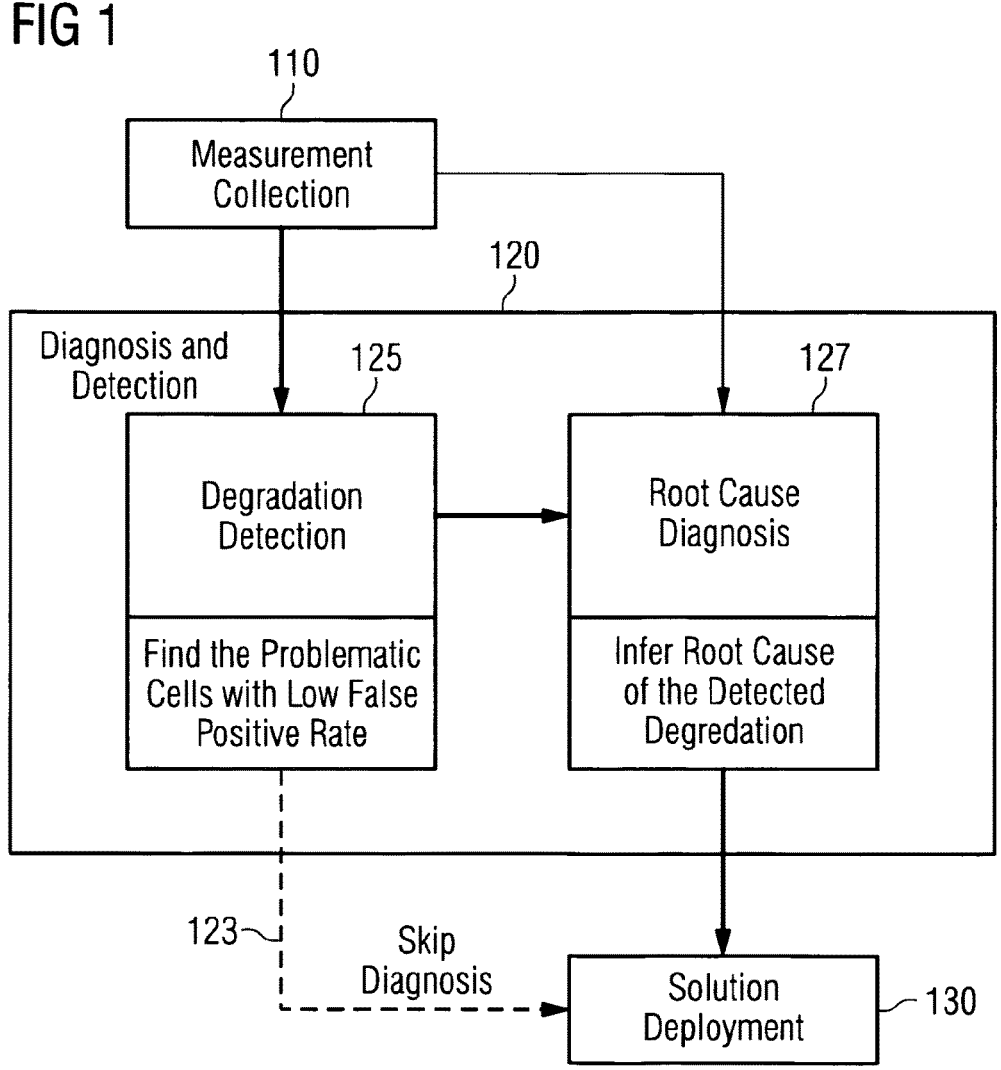
FIG. 1 illustrates a method of cell degradation detection and diagnosis.

CDDe and CDDi can be based on performance monitoring (PM) data and/or alarm reporting. Performance data includes failure counters such as call drop, unsuccessful radio access channel (RACH) access, etc. as well as more complex key performance indicators (KPIs) such as traffic load, which can be monitored and profiled to describe the "usual" behavior of users and detect if patterns are changing in a direction that indicates a problem in the network. In order to analyze the root cause of a suspected fault, the different KPIs can be correlated with each other to recognize the characteristic imprints of different faults. FIG. 1 illustrates a method of cell degradation detection and diagnosis.

As can be seen from FIG. 1, measurement collection can occur at 110. These measurements can be provided to diagnosis and detection 120. Specifically, degradation detection 125 can find problematic cells with a low false positive rate. The degradation detection 125 can also provide input to the root cause diagnosis 127, which can infer a root case of detected degradation. Alternatively, at 123, diagnosis can be skipped. Subsequently, at 130, solution deployment can be initiated in response to the detected degradation.

Thus, in certain embodiments, a solution is needed to recover the cell taking the root cause of the problem into consideration. This can be referred to as cell degradation recovery (CDR). Possible actions for recovery include cell reset, which may solve issues caused by software (SW) error, fallback to "last known good" configuration or reconfiguration of configuration management (CM) parameters, cell tilt/azimuth optimization, and the like. Root cause analysis and recovery can, for example, be done manually by an operator's troubleshooting experts and can take a long time, especially if radio re-planning is also needed. The coverage/capacity missing due to the fault may, therefore, need to be compensated until the repair is deployed and it is proven to solve the problem. This is the scope of cell outage compensation (COC) that reconfigures the radio parameters, for example, transmission power and tilt, of cells adjacent to the failure to try to fill the lost coverage/capacity.

Cellular networks may be complex due to the number of deployed network elements, the co-existence and co-operation of multiple technologies (e.g., GSM, EDGE, HSPA, I-HSPA, LTE), and multiple layers of the same technology (e.g., LTE femto/pico/macro cells). Moreover, operators regularly deploy equipment from multiple vendors, thereby increasing the need for interoperability. This co-existence of various generations of radio technology and the increasing requirement for high data rates can drive radio network deployments towards heterogeneous network (HetNet) layouts. In heterogeneous networks, a certain geographical area is covered by several radio resource layers, where different "resource layers" refer to either different radio access technologies (RATs) ("multi-RAT") or different cell layers within one RAT ("multi cell layer"). For the "multi cell layer" scenario co-channel or non co-channel deployments can be considered. In the following "multi-layer" refers to both cases and their combinations.

Figure 2:
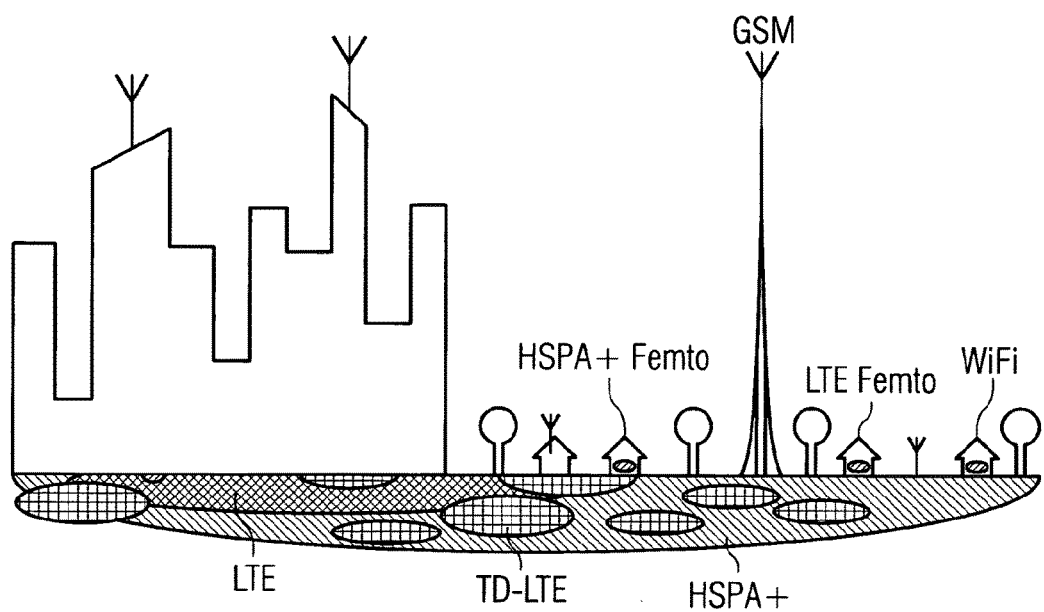
FIG. 2 illustrates a heterogeneous multi-layer network deployment.

FIG. 2 illustrates a heterogeneous multi-layer network deployment. As can be seen in FIG. 2, a geographic area can be covered by a variety of wide area, medium area, hot spots, and indoor networks. The indoor networks can include, WiFi, LTE Femto, and HSPA+ Femto. The hot spots can be, for example, TD-LTE. The medium area networks can include LTE and GSM, whereas the wide area networks can include HSPA+. Of course, these are just examples of the networks that may be in place with overlapping coverage.

Heterogeneous networks complicate SON, as the number of base stations greatly increases, as well as the number of different equipment vendors for a single deployment. For example, the separate management of individual femto cells may not even be possible or desired from a network management (NM)/domain management (DM) level as their availability cannot be predicted (customers may switch them on/off). Multi-layer deployments on the other hand provide new opportunities for cell outage detection, compensation and recovery as the additional layer may compensate for the outage of another resource layer. However, conventional self-healing focuses on a single cell within a single radio access technology (e.g., an LTE macro cell) to detect if it is in an outage and how the outage can be compensated (COC) by adapting some of the neighbor cells to provide coverage on the degraded area.

In order to assess the performance of the network elements, more than just network-side performance metrics can be utilized; in LTE, there is possibility to use certain measurements from user equipment to get performance data. This is referred to as minimization of drive tests (MDT). User equipment (UE) measurements can be used for OAM automation/SON and versatile data can be accessed via MDT. For example, in some systems there may be a capability to request positioning data along with MDT measurements. This function of MDT can be utilized by self-optimization and self-healing processes to take the location of certain events (e.g., RLF) into account when analyzing the root cause of the problem and making compensation and recovery plan.

Geo-location methods with which the location of a symptom or a fault can be tracked include network assisted positioning, global positioning system (GPS) (with built-in receivers at either the base transceiver station (BTS) (for time synchronization and/or accurate positioning) or the UEs (e.g., for personal navigation)) and digital subscriber line (DSL) line identifier (ID) (linked to a subscriber home address) in case of customer premise equipment (CPE) devices like femto cells. In LTE, advanced radio technologies such as inter-cell interference coordination (ICIC), multiple input multiple output (MIMO) and beamforming also provide the base station with positioning information; using ICIC, it can be determined whether a UE is at the cell edge or not; MIMO and beamforming provides azimuthal information. The LTE timing advance parameter computed by the eNodeB can give an approximate distance of the UE from the BTS (the granularity can be, for example, 78 meters).

Not only geo-location related physical positioning but also abstract metrics such as topological information can be utilized in certain embodiments. For example, two cells can be related and thus their detection and recovery actions can be correlated and coordinated if they are topologically close, even if their radio coverage has no overlapping area. As an example, if there is erroneously low traffic in several cells that are not adjacent but share a common transport service, e.g., same microwave aggregation ring, same access VLAN ID, etc., the problem may be with transport and not radio. Therefore, it may be useless or even harmful to initiate any radio related compensation action. Instead, transport diagnostic or optimization tools can be triggered if the problem is not a transient transport congestion but there is a fault.

Conventional networks mainly use alarms as notification of certain problems towards the operator. KPI values may also be taken into account when considering whether an alarm is to be raised. However, alarms and KPIs conventionally only indicate degradations on the level of cell granularity (e.g., cell ID contained in the alarm), which means that any compensation or recovery action based on the received alarms can only assume that the indicated cell as a whole is degraded/non-optimally configured/etc. This may lead to an "over-compensation" in some cases. For example, if only a small part of the cell is affected by a degradation, an overcompensation may be to adjust parameters of all adjacent cells to compensate for the lost coverage. Usually, radio coverage problems such as shadowing do not affect the whole coverage area of a cell but only parts of it. Additionally, problems affecting only a small area of a cell may not be detected at all because of the little influence on the overall cell performance.

In heterogeneous network deployments, for example in densely populated urban areas, it can be the case that although a resource layer is in outage, there are still enough resources in other layers to provide service. Thus, no compensation (such as tilt/power change in neighboring cells) may be needed. Such compensation actions themselves have an impact on the coverage/quality of service (QoS) around the area, so unnecessary use of such actions can have a ripple effect. For example, in urban cases, outdoor users may have at least a minimum level of service from the neighboring cells even without any reconfiguration.

Conventional CDDe/CDDi methods operate at the cell level, making detection and diagnosis based on one cell/layer. However, fault incidents may have uncorrelated root causes across the layers. Also, decision about a compensation/recovery action is made based on one cell/layer, which may lead to conflicting actions. For example, if there is a problem with cells in different layers at the same location, the root cause of the problem may be an environmentally induced degradation like shadowing or a problem with shared transport link than separate coinciding faults of all resource layers. On the other hand, if a cell reports problem but other cells at same location (in another layer) report no failure, it may be the problem of the original cell only.

Certain embodiments enhance current cell degradation detection (CDDe), cell degradation diagnosis (CDDi), and cell degradation recovery (CDR) methods in order to enable efficient self-healing in heterogenous network scenarios. This may be accomplished, for example, through the following. Multi-layer reasoning can create an integrated heterogeneous network resource view that integrates the information of different cell layers. Additionally, sub-cell level reasoning can consider fine-granular location information of network measurements obtained by MDT or similar facilities.

The methods according to certain embodiments can perform sophisticated reasoning that can provide self-healing behavior in heterogeneous networks, and can contrast to conventional systems which perform single-layer, cell-level reasoning. Certain embodiments provide several functional blocks useful for enabling multi-layer and sub-cell level reasoning, as well as a framework to effectively combine them, and an architecture that leverages their full advantages. Features of certain embodiments can be integrated into the CDDe, CDDi, and CDR components as shown in Table 1, below. In the following discussion, both functionalities are described in more detail and their advantages are outlined.

TABLE 1

Multi-layer and sub-cell level reasoning in CDDe, CDDi, and CDR

|  | Sub-cell level reasoning | Multi-layer reasoning |
| --- | --- | --- |
| CDDe | Sub-cell level detection | n/a |
| CDDi | Sub-cell level diagnosis | Multi-layer diagnosis |
| CDR | Sub-cell level recovery (compensation) | Multi-layer recovery (compensation) |

Sub-cell level reasoning can enable the detection, diagnosis, and compensation on a sub-cell level instead of a conventional cell-level spatial scope through the usage of measurements, such as MDT measurements, and other sources of network data featuring the geo-location of a taken measurement. Furthermore, a tolerance of the location may be added according to the source of the geo-location information. For instance, geo-locations taken by GPS have a small tolerance of several meters whereas measurements which can be only located to be within a cell have a larger tolerance, which may be, for example, the size of the cell.

The use of sub-cell level reasoning can lead to detection and diagnosis being able to localize failures with a fine-grained resolution smaller than the size of the radio cell. This can help to identify and adjust for environmentally-induced failures, like shadowing, which may impede just a part of the cell. Additionally, the precise localization of failures can enable a focused recovery. For instance, conventional COC methods may solely compensate cell degradations uniformly: they change the configuration of all surrounding cells to cover a circular area around the degraded cell. However, if just a part of the cell is impeded this approach can have an unnecessary impact on the non-degraded parts of the considered cell. These impacts can include interference in case of a co-channel deployment or reduced capacity and increased overhead in a non-co-channel deployment. Using sub-cell-level reasoning, the recovery can specifically direct the compensation to the location of the failure in the cell, thus reducing negative impacts of compensation.

Multi-layer reasoning can extend detection, diagnosis, and recovery to take into consideration different cell layers in heterogeneous networks. On the one hand, multi-layer reasoning allows the diagnosis to analyze and correlate failures on different layers, which can improve the diagnosis result. For instance, if cells at the same location are degraded then it may be caused by some environmental issue. However, if only one of these cells shows degradation then the degradation may be caused by some cell-intrinsic issue. As another example, if a micro cell shows a significant increase in traffic while an overlapping macro cell shows a decrease, this behavior may point to a degradation of the macro cell if other explanations like an ongoing load balancing procedure can be ruled out. Furthermore, the information from different layers can also be used to improve the localization of a failure. If a micro cell and an overlapping macro cell show the same (for example, environmentally induced) problem then both problems may have the same cause, and that this cause is located within the coverage area of the smaller micro cell.

On the other hand, the recovery of cell degradations and outages can also benefit from information of other layers. Because a specific location can be covered by several cell layers, recovery actions (for example, compensation) can be more focused and thus avoid causing "collateral damage" to other healthy cells. For example, the system can avoid causing additional interference when compensating in a co-channel deployment. For instance, a degraded cell can cover an area that is also covered by cells of a different layer. In this case, a compensation of the degradation may not be necessary since the other cells can take over the traffic in this area. It is also possible that a specific area is showing a coverage hole due to some shadowing. If there are small heterogeneous network cells like micro cells in the proximity of the coverage hole then these cells may be reconfigured to extend their coverage to precisely the problematic area. As a result, the problem can be compensated with reduced impact compared to compensating with a relatively huge macro cell.

Figure 3:
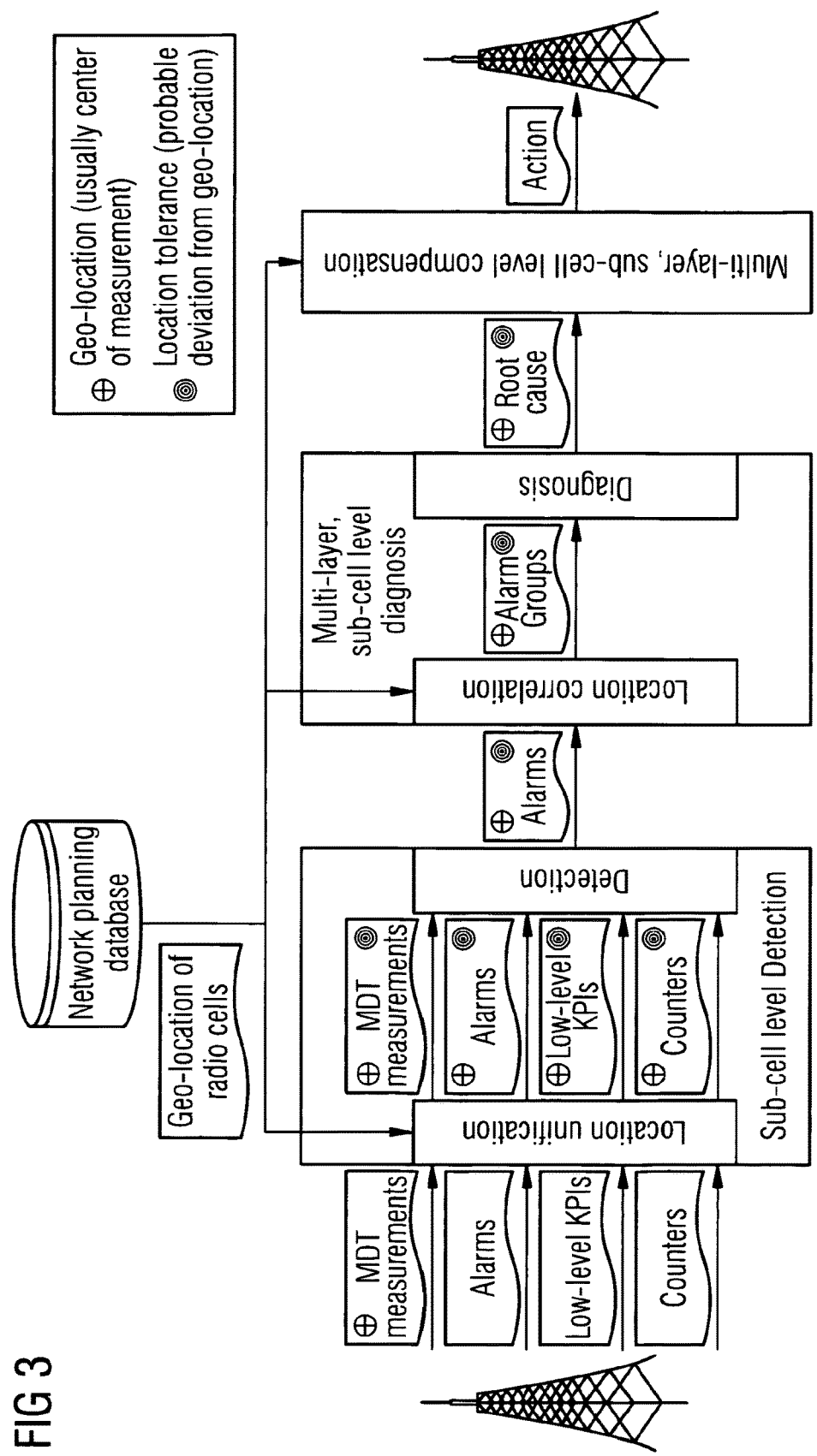
FIG. 3 illustrates an architecture of a network management system according to certain embodiments.

FIG. 3 illustrates an architecture of a network management system according to certain embodiments. More particularly, FIG. 3 depicts the functional architecture of certain embodiments, including three major functional blocks: sub-cell level detection; multi-layer, sub-cell level diagnosis; and multi-layer, sub-cell level recovery. These blocks can be variously implemented in terms of hardware, either by following the functional blocks or by departing from them. The following description outlines these functional blocks in more detail. Not all embodiments necessarily include all functional blocks shown in FIG. 3. For example, the system may, in certain embodiments, use only one or the other of multi-layer reasoning and sub-cell level reasoning.

Sub-cell level detection can be responsible for evaluating the "health" status of a network cell or element by analyzing measurements and alarms. In case degradation is detected, sub-cell level detection can provide descriptive alarms which are annotated with a location and location tolerance when being forwarded to the diagnosis. Sub-cell level detection can solely concentrate on a single cell and, so, a single network layer. That is, it does not take advantage of multi-layer reasoning. The functional block of sub-cell level detection can include two interacting sub-components.

A location unification component can annotate all data from the network element (NE) (for example, measurements and alarms) with geo-location information, for example, a geo-location and a tolerance. For example, the location unification component can utilize the geographical cell area information from the network planning database. For instance, MDT measurements can be annotated with coordinates that identify where they have been taken. The location unification component can also add a geographical tolerance to the data. To provide the tolerance, the location unification component can be configured to identify the source and significance of the measurements. Here the significance can refer, for example, to the accuracy of the source of geo-location information. In the same way, the location unification component can classify some alarms as being related to the whole cell. Thus, the location unification component can annotate these alarms with the location and tolerance of the whole cell.

Figure 4:
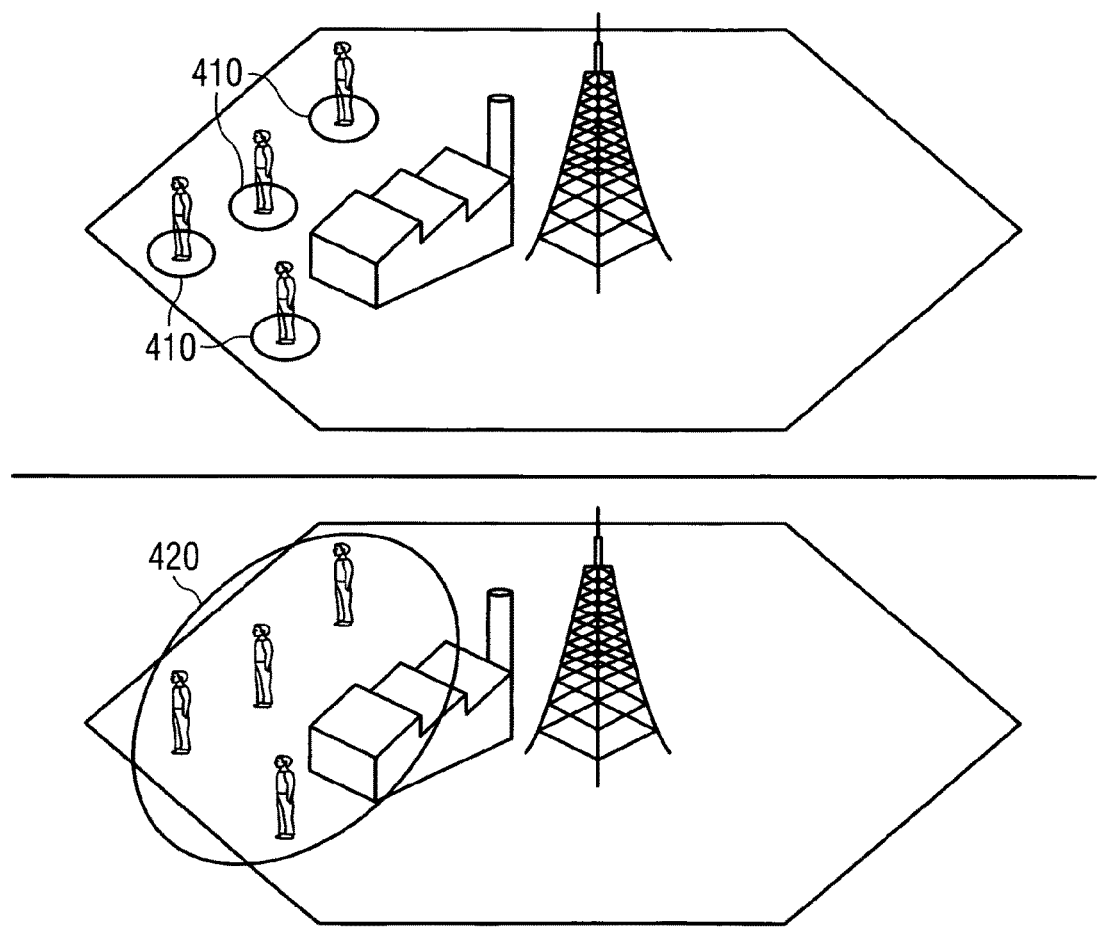
FIG. 4 illustrates correlation of detected information according to certain embodiments.

The detection component can take the annotated data, correlate the location information of the data (with one another) and analyze the data anomalies. Some scenarios are discussed below in which correlation of location information from measurements can improve detection. The output of the detection component can be a set of descriptive alarms for detected problems. The locations of measurements can be correlated as shown in FIG. 4, which illustrates correlation of detected information according to certain embodiments. That is, separate measurements 410, each with its own geo-location and tolerance can be correlated in order to create one alarm 420 with an averaged location and tolerance. In order to implement this component, conventional detections methods can be extended to correlate the locations of different measurements.

The multi-layer, sub-cell level diagnosis module can analyze the geo-location annotated, descriptive alarms provided by the detection module in order to come up with a root cause for the problem at hand. In contrast to conventional diagnostic approaches, multi-layer, sub-cell level diagnosis can take advantage of the location information of alarms to provide improved accuracy and precision of diagnosis. This extension can be provided through the interaction of two sub-components.

A location correlation component can take the annotated alarms from all cells of all layers and can group them according to their location. That is, alarms with overlapping alarm regions, which are determined by the geo-location and the tolerance of the alarm, can be grouped together. Thus, one alarm can be assigned to more than one group can consequently can be present several times in various groups. For instance, if there are two overlapping alarms in a cell (each alarm with a small tolerance), the two alarms can be built into an alarm group. However, if there is a third alarm whose tolerance is the whole cell then an alarm group containing all three alarms can also be created. The set of alarm groups can at least contain a group for each cell where a problem exists. The location correlation can, thus, be useful for multi-layer reasoning.

Subsequently, the diagnosis component (the components can interchangeably be referred to as modules herein) can perform a diagnosis based on the alarm groups. Thus, the alarms in a group which are within a cell-layer can be analyzed using classical intra-cell layer diagnostic approaches. Additionally, inter-cell layer diagnosis methods can be applied to the alarms. The inter-cell layer diagnosis methods can analyze alarms in different cell-layers at a location and, thus, allow distinguishing between cell intrinsic and environmental problems more accurately. Furthermore, the methods can also correlate the diagnosis results for different alarm groups in order to localize a problem more precisely. The intra-cell layer diagnosis can either performed sequentially with the inter-cell layer analysis or in combination therewith. The diagnosis component can output possible, geo-location annotated root causes for the problems in the network.

A multi-layer, sub-cell level recovery component or module can determine the best way to recover from a degradation given a root cause diagnosed by the multi-layer, sub-cell level diagnosis component. Thus, the multi-layer, sub-cell level recovery component can consider the geo-location and location tolerance of the problem and align the problem's location with the geo-location of the radio cells in the network. A goal of the multi-layer, sub-cell level recovery component can be to minimally change the normal operation of the non-faulty network parts. For instance, in COC a compensation of a cell outage by tuning the adjacent cells can create further problems in a ripple, domino, or ping-pong effect amongst cells. Hence, minimizing or avoiding compensation can be used to avoid such effects. Several scenarios are discussed below, in which compensation is focused in and the goal of minimal change is accomplished.

The above examples may be particularly applicable to macro, micro, and pico cells. Femto cells are conventionally not visible to the network management system one-by-one; instead, they are conventionally managed through a femto-gateway. Enterprise femtos, where there are cell boundaries between femto cells, for example, are typically managed this way. By contrast, individual femtos are traditionally separate in the sense that they have only macro-cell neighbors. For example, if an end user buys a femto and install it at home, it is typically separate conventionally. Whether or not femtos are included in the network management described above, if there is a significant percentage of femtos in outage, this aggregate information can be be detected, localized (as much as possible), signaled and compensated. For example, certain embodiments consider statistics-based alarms in detection for the femto scenario. That is, the femto management raises an alarm if, for example, 10% of all the femtos managed by it are faulty and the detection takes this aggregated alarm into consideration.

Certain embodiments rely on particular functions and sources of information. For example, the detection, diagnosis and recovery of failures in mobile networks are complex tasks that require a lot of information about failures, their symptoms, and suitable recovery options. Thus, the network performance and fault data as well as the expert knowledge to interpret the data can be provided to the system. Moreover, fine grained compensation of coverage holes in a directed manner may require an active antenna technology. For instance, an ability to enlarge or reduce a cell's coverage area in a specific direction may be useful.

In order to localize a fault on a sub-cell level, the system can be provided with accurate and fine-grained geo-locations of measurements, for example, through MDT. Other sources of information regarding measurements are also permitted.

So that the system can take into consideration cells of different layers in the network, this topological data can be provided to the system. This topological data can also include accurate geo-locations of the network elements and estimations of the area covered by the cells. The information in this database can be computed from other information. For example, models can be used in which the cells are to assumed to be circles, simulators can be used to estimate coverage, or MDT-based estimations can be used.

Sub-cell level and multi-layer reasoning can make self-healing in mobile networks more effective. On the one hand, the detection and diagnosis of failures may be more accurate and, on the other hand, the recovery of failures may be more directed. In the following, several scenarios are presented that demonstrate how certain embodiments can achieve these or other advantages compared to conventional self-healing approaches, such those approaches that do not consider multi-layer or sub-cell location information.

Figure 5:
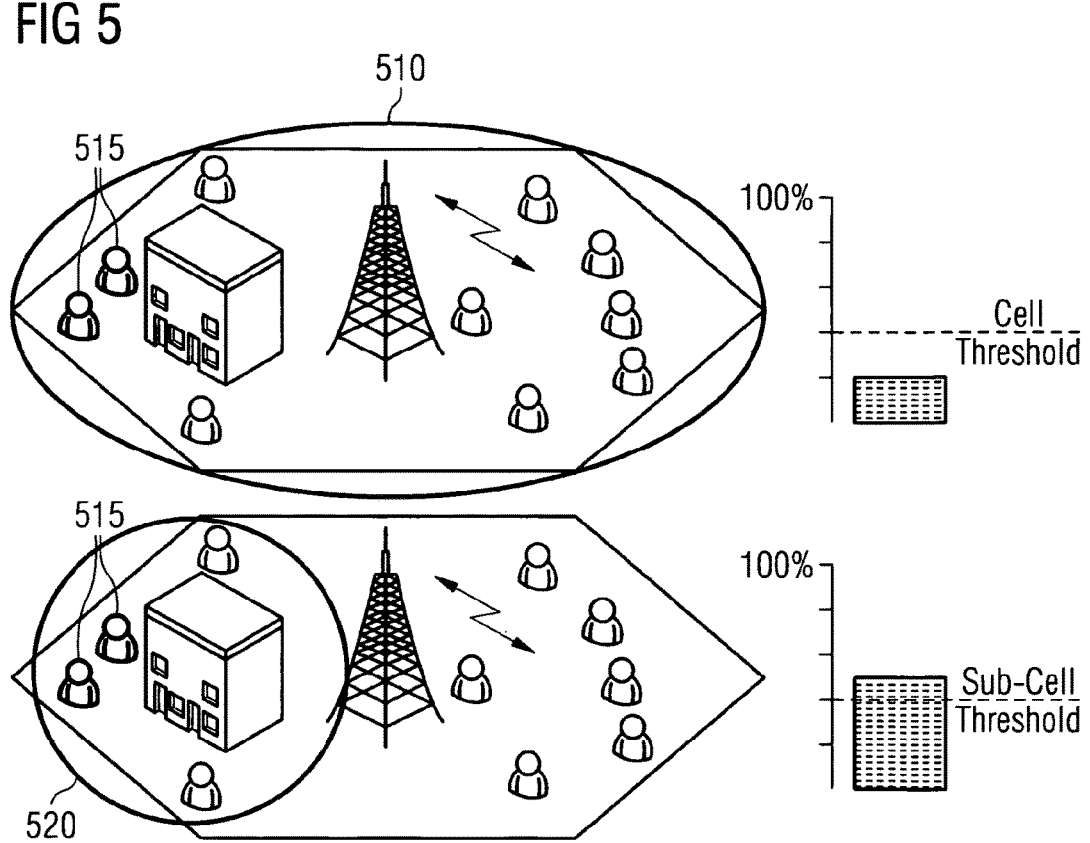
FIG. 5 illustrates sub-cell level detection of failures according to certain embodiments.

FIG. 5 illustrates sub-cell level detection of failures according to certain embodiments. Sub-cell level reasoning can help to improve the accuracy of the detection of failures by enabling the analysis of areas smaller than a cell. FIG. 5 depicts a scenario in which this ability provides significant advantages over conventional approaches. The upper portion of FIG. 5 shows that common detection methods perform statistical analysis of the whole cell 510. Hence, local coverage problems, shown as solid FIG. 515, are hard to detect since their impact on the overall cell performance is less significant, as can be seen in the bar chart on the right. Certain embodiments using sub-cell level detection, as shown in the lower part of FIG. 5, can analyze issues in a smaller area than the cell 520. Consequently, small coverage problems 515 can have a significant impact on the performance in this sub-cell area and, thus, may be easier to detect, as can be seen in the bar chart on the right.

Figure 6:
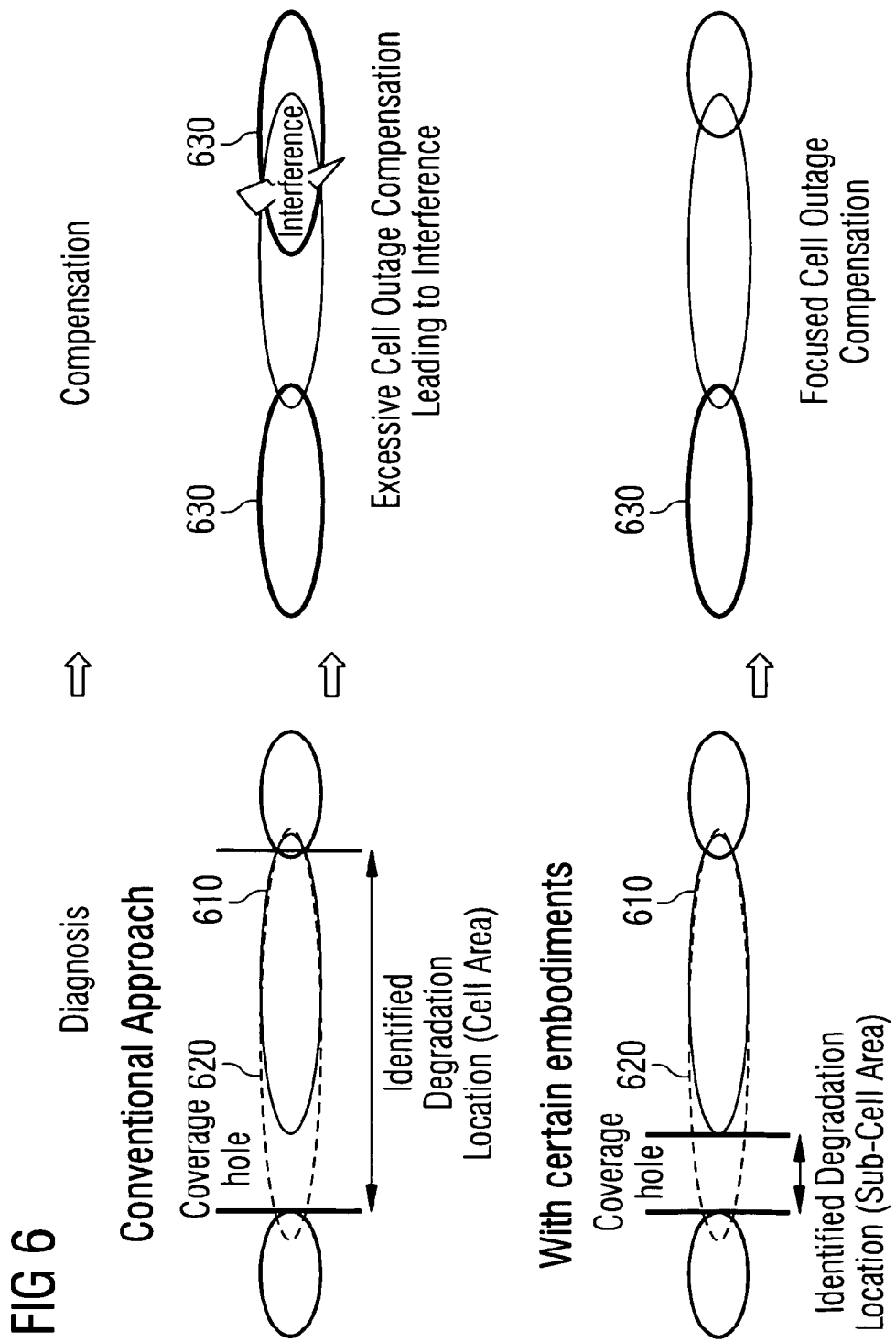
FIG. 6 illustrates a scenario in which a single radio cell layer is considered according to certain embodiments.

Furthermore, sub-cell level reasoning can also improve diagnosis and recovery of failures, because the exact localization of problems can permit directing recovery efficiently. FIG. 6 depicts a scenario with a single radio cell layer, where a cell is partially degraded and is to be compensated. In the upper part, the conventional situation is shown. Suppose the operations, administration, and maintenance (OAM) system diagnoses a cell with degraded coverage, shown as central solid ellipse 610 vs. its desired coverage, shown as dashed ellipse 620, leading to a local coverage hole. Since there is no detailed location information available, the system is not able to localize the coverage hole exactly, the coverage hole being defined by the vertical lines. Consequently, for compensating the problem, the system conventionally assumes that the coverage is reduced evenly around the cell center. Thus, conventional compensation algorithms increase the coverage area of the neighbor cells uniformly, as depicted by larger ellipses 630 on right side. However, since the area right of the cell center is still covered by the faulty cell, this behavior leads to an increased interference, indicated by a flash. Certain embodiments avoid this outcome as shown in the lower part. The diagnosis is enabled to accurately localize the coverage hole resulting from the degradation. This allows the system to direct the compensation to this problematic area. Hence, the neighbor cell on the right hand side is not reconfigured and thus the undesired interference can be minimized.

Figure 7:
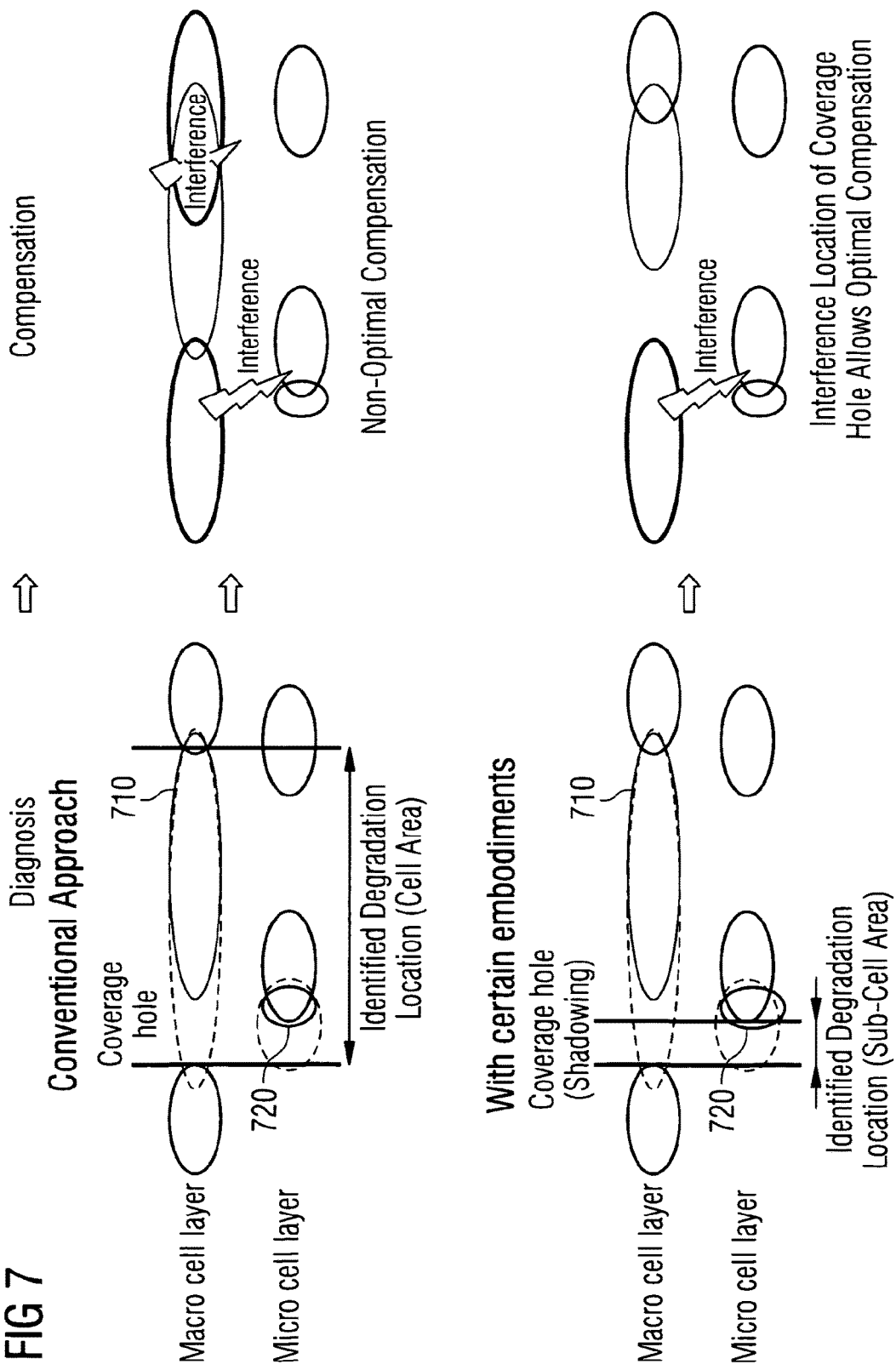
FIG. 7 illustrates multi-layer reasoning in a scenario where a micro cell is completely covered by a macro cell according to certain embodiments.

Multi-layer reasoning can further be used by the diagnosis component of certain embodiments to infer a more accurate location of a failure in case there is no sub-cell level location information available. This can be the case because either sub-cell level location information is not supported by the NEs or because there is an insufficient amount of localized measurements, for example, via MDT. FIG. 7 depicts a scenario where a micro cell is completely covered by a macro cell. If both layers suffer from an equal, externally induced problem, for example, shadowing by a high building, then one failure can be affecting both layers in parallel, depicted as center ellipse 710 in macro layer, and left-most ellipse 720 in micro layer. The system can correlate the data from both layers and induce that the problem must be somewhere in the coverage area of the micro cell, shown by the vertical lines. Hence, the location of the problem can be more accurately identified with respect to the macro cell than using a conventional approach.

Figure 8:
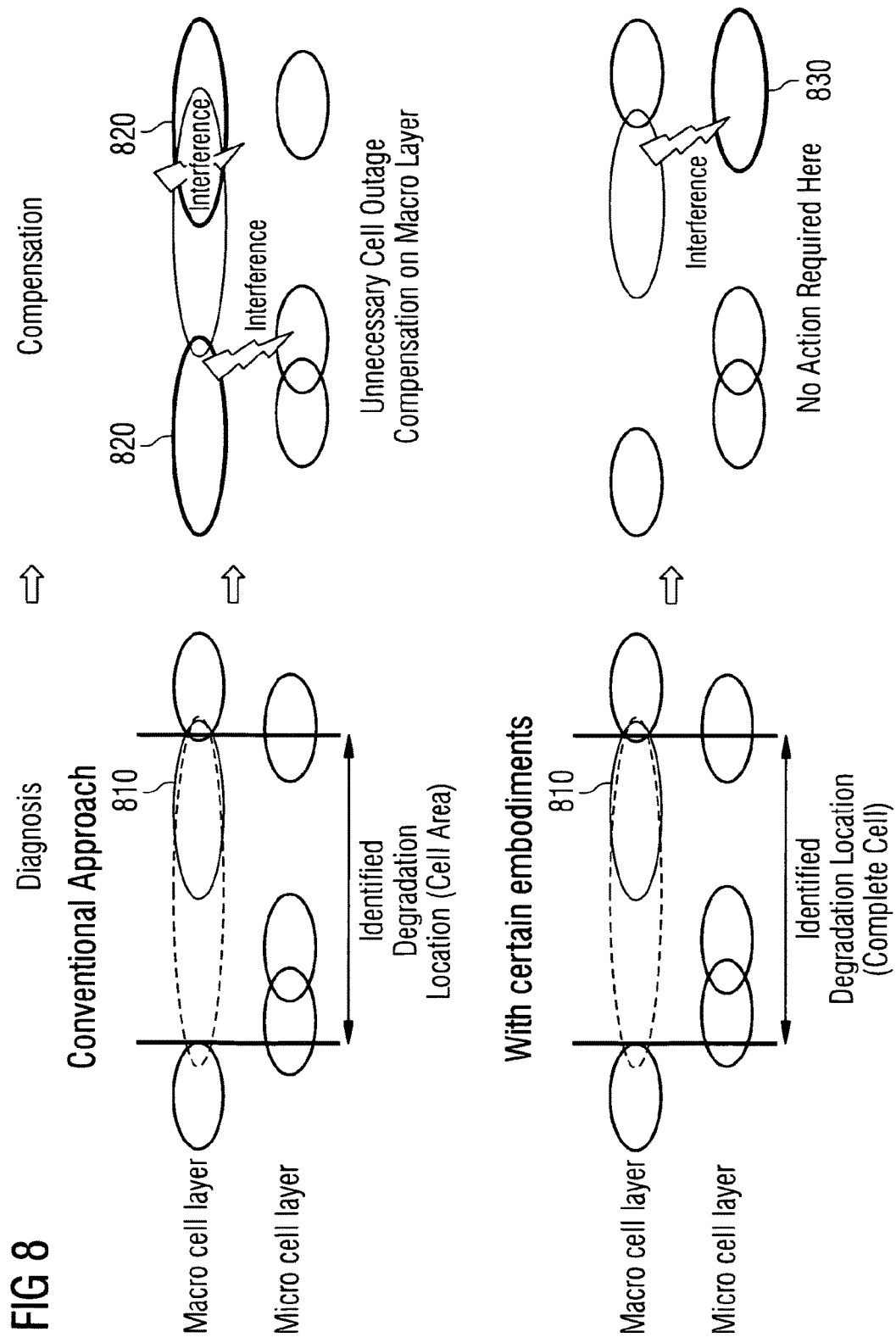
FIG. 8 illustrates multi-layer reasoning in a scenario without accurate location information according to certain embodiments.

Independently of the location information for failures provided by the diagnosis component, the recovery from these problems can be aided by using all layers of the mobile network instead of just the affected cell layer. FIG. 8 depicts this in a scenario without accurate location information, two cell layers in a co-channel deployment, and a degraded macro cell, shown as center ellipse 810, causing a coverage hole, indicated by vertical lines, which has to be compensated. The upper part shows that conventional compensation procedures can solely use the macro layer to resolve the issue. Hence, the coverage area of the adjacent cells is equally extended, shown as larger ellipses 820. Since there is a micro layer overlapping with the macro layer, this causes interference in a co-channel deployment, indicated by flashes. The lower part of FIG. 8, shows that certain embodiments allow for a better behavior. Although the location of the coverage hole is not accurately determined, as shown by the vertical lines, the system can recover in a more focused way from the degradation by taking advantage of the other layers. On the one hand, the system can reason that the left part of the degraded cell does not have to be compensated at all since the two micro-layer cells are already covering the problematic area. On the other hand, the system can infer that compensation the right part of the degraded cell with the micro layer cell, shown as larger ellipse 830, is more precise than using the macro layer cell. As a result, certain embodiments allow reducing interference in such cases by either omitting unnecessary compensations or performing compensations with the best situated cells of all layers. Note that due to the inaccurate localization of the coverage hole, the compensation can assume a uniform degradation of the cell causing interference on the right side.

Figure 9:
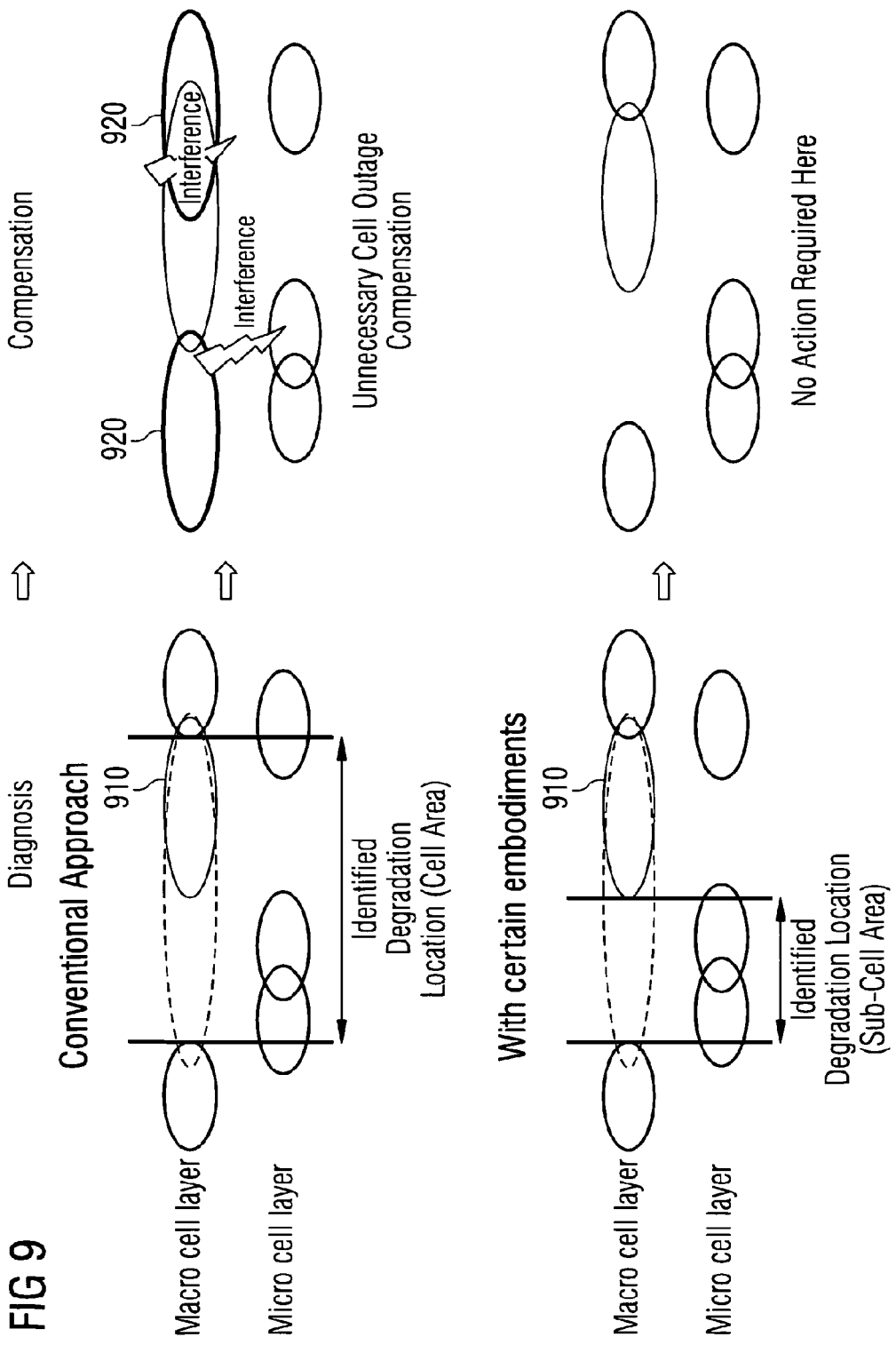
FIG. 9 illustrates multi-layer reasoning in combination with sub-cell reasoning for a macro cell in degradation according to certain embodiments.
Figure 10:
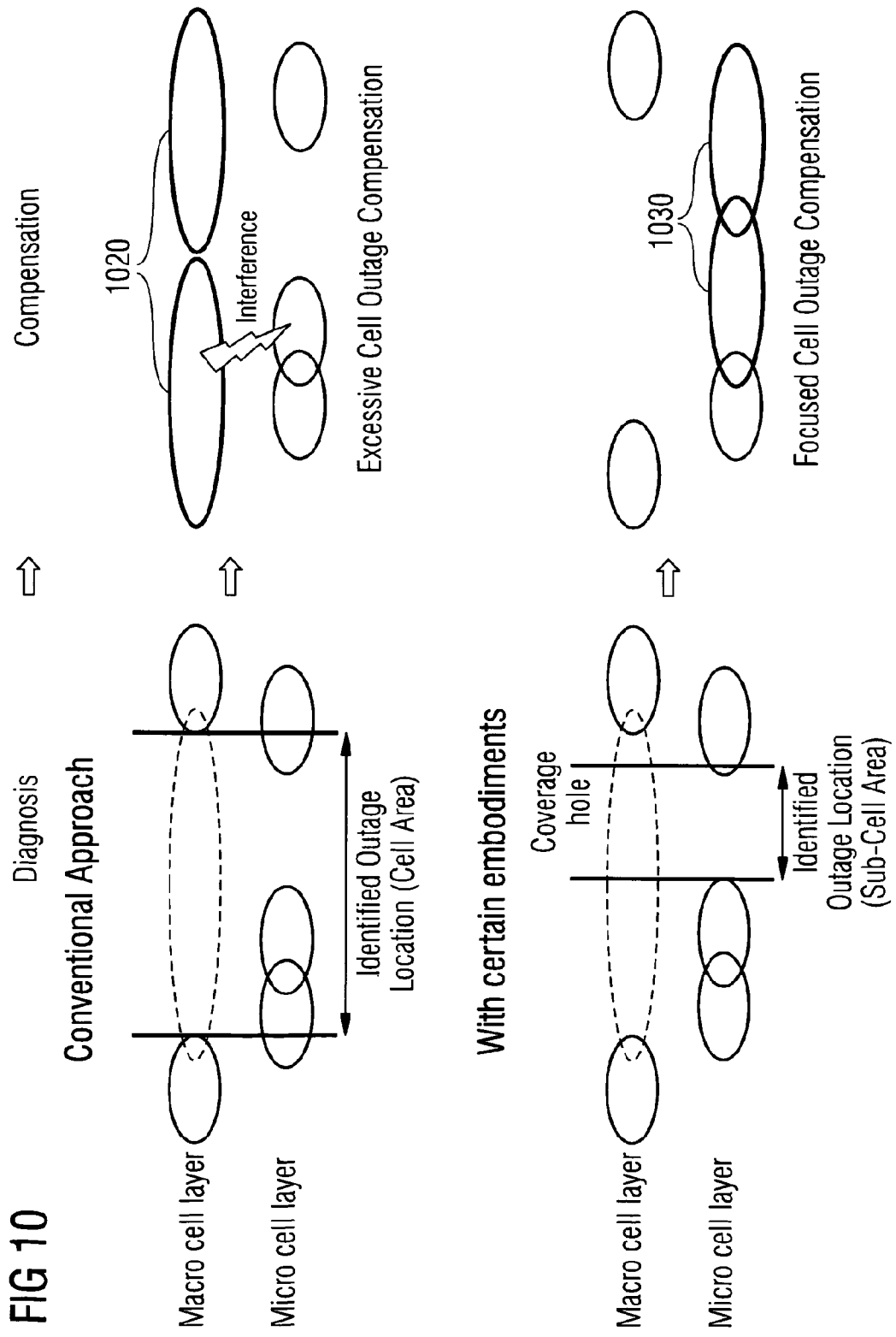
FIG. 10 illustrates multi-layer reasoning in combination with sub-cell reasoning for a macro cell in outage according to certain embodiments.

Multi-layer, sub-cell level reasoning combines the advantages of both features. Thus, the functionality in the scenarios presented above can be applied to a combined system as well. FIG. 9 illustrates the potential of certain embodiments in a multi-layer, co-channel deployment scenario where a degradation of a macro cell, shown as center ellipse 910, can be accurately detected and diagnosed using precise location information, whereas FIG. 10 depicts the same scenario for a macro cell in outage. In both figures, the upper part shows the behavior of conventional detection, diagnosis, and recovery approaches. As in the two use cases before, the system, on the one hand, is not able to precisely determine the location of the problem, shown as vertical lines, and, on the other hand, does not consider other layers of the network serving the same area. Consequently, in this example the usage of a compensation procedure, shown as larger ellipses 920 and 1020, causes interference, shown as flashes, in the network. Certain embodiments improve this situation. First, the sub-cell level localization, shown as vertical lines, of the problem allows the system to compensate the coverage holes in a more directed way. Second, the consideration of other layers and radio access technologies (RATs) allows the system to omit unnecessary compensation when a problematic area is served by cells on other layers (FIG. 9), and to perform the compensation more precisely by using smaller and better situated cells, shown as larger ellipses 1030, on other layers (FIG. 10). As a result, interference problems by the compensation can be reduced.

Figure 11:
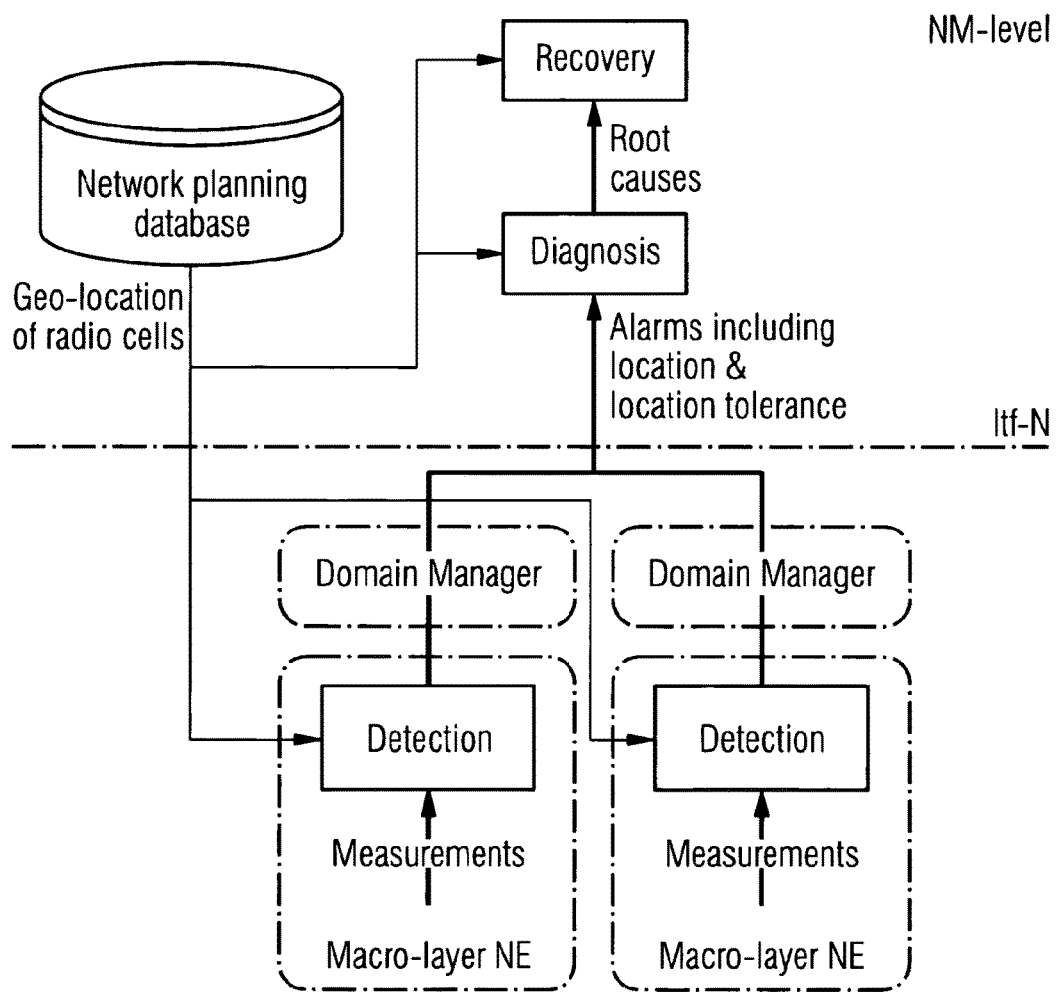
FIG. 11 illustrates the architecture of a system according to certain embodiments.

The architecture of certain embodiments, for example, the mapping of the functional blocks presented in FIG. 3 to the elements of a mobile network, may be useful for leveraging its full potential. In one example, a 3-layered 3GPP architecture is considered. FIG. 11 illustrates the architecture of a system according to certain embodiments. The architecture, as considered, includes a network element level at the bottom, a domain management (DM)/Element Management (EM) level in the middle, and Network Management (NM) level on top. On the one hand, the lower a functional block is placed in this architecture, the more fine-grained data is available at smaller time intervals. The scope of the data (the number of different network entities it comes from), however, decreases at lower levels of the architecture. On the other hand, the higher a functional block is placed, the broader is the scope of the data, which can be useful for multi-layer reasoning, because it integrates data from different entities. However, this means that more and potentially less granular data may be available. In the following discussion, three architectural options for certain embodiments are presented:

First, a centralized architecture can assign the three functional blocks to the NM or DM level. Thus, the detection, diagnosis and compensation components can be pooled at a central location. Hence, data from all network elements can be transferred to the NM/DM level for analysis. This option has the advantage that, on the one hand, the diagnosis component can easily analyze data from all network elements since all data is centrally available, and, on the other hand, the recovery component can easily perform a healing action since it solely has control over the network. However, this approach can use a lot of data traffic from the edges of the network to the NM level. Numerous fine-granular measurements can be transferred in order to provide the detection component with sufficient data to be efficient. This traffic places a load on the network.

For the NM-level cases, this option can use open and standardized interfaces between DM and NM level for exchanging low level performance data containing location information, for example, for MDT measurements, in order to be multi-vendor capable. For the vendor-specific DM-level case, no open interface is required.

In a second approach, a decentralized architecture can put the detection, diagnosis, and recovery components on the network elements. Hence the functional blocks are highly distributed over the network. An advantage of this approach is that the analysis of the network data is performed close to where it is created, thus, reducing traffic overhead. However, a complex data exchange between the NEs may be needed to provide access for the diagnosis and recovery components to information from several layers. Hence, with this solution multi-layer reasoning may be omitted, or the network may be loaded with traffic between the NEs. Furthermore, if the recovery component in one NE has no control over other NEs, a complex coordination scheme can be implemented to avoid interactions of adjacent recovery components with negative effects on network performance. This architecture can utilize open and standardized interfaces for exchanging information about detection/diagnosis events in the form of alarms as well as recovery actions between different NEs.

A third, hybrid architecture can aim to leverage the advantages of the two former architectures by assigning each functional block to the most suitable network layer. As illustrated in FIG. 11, the detection component can be distributed to the NEs, whereas the diagnosis and recovery components can reside centrally at the NM (or DM) level. The advantage of this assignment is that the detection is able to perform its analyses close to the source of data, which may allow for a timely and comprehensive investigation while minimizing the necessary network traffic. The diagnosis and recovery components can benefit from the central deployment by having easy access to all data from all detection functions on all network layers. Hence, the correlation of multi-layer data is readily possible. Additionally, the full, central control of the recovery component over the network can ease the mitigation of failures, because no complex coordination of independent entities is necessary.

For the case of diagnosis and recovery being at the NM-level, the interface between the detection and diagnosis functional blocks can be an extension of the Itf-N interface of the 3GPP architecture. This interface can allow the detection components to send alarms, which are annotated with location and location tolerance data, to the central diagnosis component. Furthermore, this interface can decouple the detection from the diagnosis. Thus, alarms from detection components by different vendors can be correlated in the diagnosis. Moreover, concrete detection algorithms can be vendor specific and, thus, optimized for the specific hardware of that vendor.

Another case is diagnosis being at the DM-level (due to vendor specifics) and recovery being at the NM-level. This implies per domain diagnosis components which notifies a unified recovery component at the NM-level based on standardized fault causes.

In summary, certain embodiments can improve existing CDDe, CDDi, and CDR methods in a heterogeneous network environment by utilizing location information for measurements and alarms provided by, for example, MDT or network planning, and topological network data of all network layers. Concretely, the advantages of certain embodiments can include an improved accuracy of CDDe by providing a fine-grained sub-cell level anomaly localization, an improved correctness of CDDi by considering sub-cell level location information of alarms and correlating them over co-located cells, and an improved quality of CDR by considering the exact location of failures and execution of recovery actions on other network layers.

Certain embodiments can even provide benefits when just one of the dimensions introduced in Table 1 is extended, such as when MDT data is not available. Several scenarios are outlined above, in which certain embodiments improve network management by minimizing or avoiding reconfigurations of NEs as much as possible.

Figure 12:
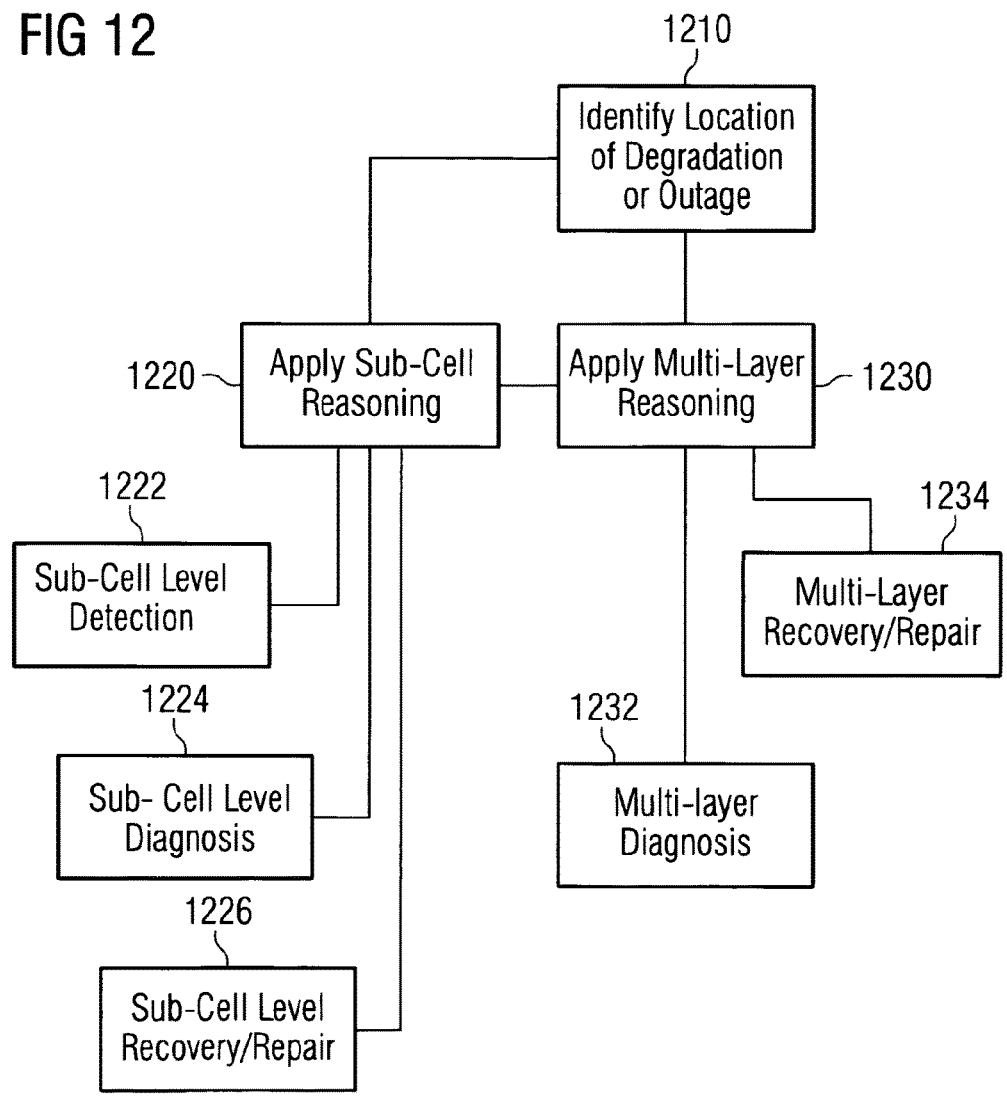
FIG. 12 illustrates a method of self-healing according to certain embodiments.

FIG. 12 illustrates a method of self-healing according to certain embodiments. The method of FIG. 12 can include self-healing at least one first cell, such as a larger cell or a cell of a first radio access technology, in a network, such a heterogeneous network, or at least one second cell, such as a smaller cell or a cell of a second radio access technology, in the network. The terms "larger" and "smaller" can refer to the coverage area or coverage volume of the cells. The cells may be of the same approximate size and type or may be of different types. Thus, for example, as can be seen from FIG. 2, a heterogeneous network can have a variety of cells with overlapping coverage, from a very large coverage for some macro cells to a coverage of only a few meters for some indoor cells. Certain embodiments can also apply to embodiments in which each "cell" is the area covered by a respective remote radio head of a distributed base station. Larger and smaller cells are provided as an example of these various possibilities.

More than one larger cell or smaller cell (or combinations thereof or combinations of other categories or types of cells) can also be self-healed. The term "self-healing" here refers to an automated process of network management in which a fault is detected, diagnosed, and repaired. The repair can include compensation or the like. It is not required that a self-healing method include all of the detection, diagnosis, and repair. Instead, several self-healing methods can be performed in coordination. For example, as shown in FIG. 11, a detection method can be performed at the network element level, but the diagnosis and recovery (repair) can be performed at a network management and/or domain management level. Each of these methods individually or in combination can be referred to as self-healing.

As shown in FIG. 12, the method can include, at 1210, identifying a location of degradation and/or outage of a cell (for example, a relatively large cell, such as a macro cell, or a relatively small cell, such as a femto cell). The identification can be performed automatically, without manual intervention. Moreover, the identification can be performed based on opportunistic measurements, rather than by intentional surveying. This detection can be performed by a network element (such as an access point) or by a network device such as a network management device. The self-healing can also include a network management device applying at least one of multi-layer reasoning to integrate information of different cell layers, at 1230, or sub-cell level reasoning to consider fine-granular location information, at 1220. The self-healing can include the network management device applying both the multi-layer reasoning and the sub-cell level reasoning. The two approaches can be applied in sequence or in combination.

The self-healing, in any case, can be based on location information, such as the location of the degradation or outage. The location information can also include relative location information of one layer of coverage with respect to another layer of coverage. In certain embodiments, the location information can include information regarding the precise location of user equipment within the coverage area. The location information can also include a tolerance of the location information. The location information can include BTS measurements of location, or other location information, such as GPS data.

The sub-cell level reasoning can include processing network measurements, which can be measurements of location obtained by network elements or reported by user equipment.

The sub-cell level reasoning can be applied to at least one of sub-cell level detection 1222, sub-cell level diagnosis 1224, and sub-cell level recovery 1226 or repair. The multi-layer reasoning can be applied to at least one of multi-layer diagnosis 1232 and multi-layer recovery or repair 1234.

Thus, the self-healing can include at least one of cell degradation detection, cell degradation diagnosis, and cell degradation recovery, that is, for example, the self healing can include just cell degradation detection, just cell degradation diagnosis, just cell degradation recovery, or any combination of cell degradation detection, cell degradation diagnosis, and cell degradation recovery. When a sub-cell-level fault is detected, sub-cell-level restoration can be performed. The sub-cell level detection can provide descriptive alarms that are annotated with a location and location tolerance and then forwarded to the diagnosis.

The self-healing can include, for example as an aspect of the multi-layer reasoning, comparing coverage of a macro-cell layer to coverage of a micro-cell layer. Moreover, the self-healing can include compensating coverage, or other characteristics, of a macro-cell layer based on information regarding a micro-cell layer or compensating coverage, or other characteristics, of the micro-cell layer based on information regarding the macro-cell layer. Here, macro-cell layer is simply an example of the layer of a larger cell and micro-cell layer is simply an example of the layer of a smaller cell. FIG. 7, for example, illustrates how a macro cell layer coverage can be adjusted based on location information from the micro cell layer. This is just one non-limiting example.

The multi-layer reasoning and the self-healing in general can include inter-cell diagnosis, intra-cell diagnosis, and intra-cell layer diagnosis. The inter-cell diagnosis, the intra-cell diagnosis, and the intra-cell layer diagnosis can be performed in sequence or in combination with one another.

Figure 13:
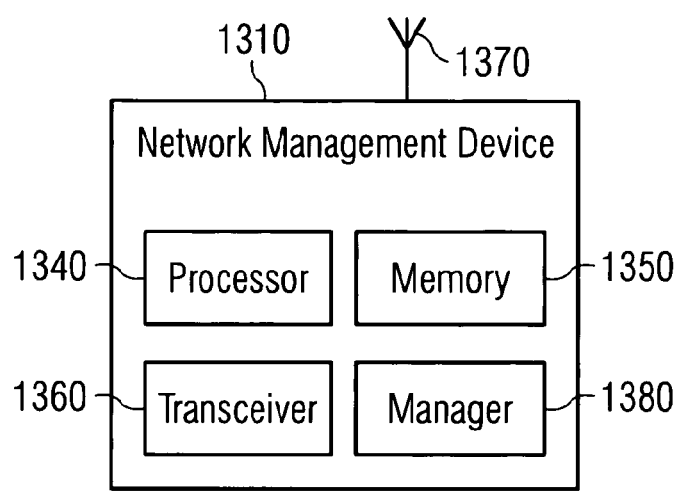
FIG. 13 illustrates an apparatus according to certain embodiments.

FIG. 13 illustrates an apparatus, such as a network management device, according to certain embodiments. As shown in FIG. 13, a network management device 1310 may be equipped with at least one processor 1340, at least one memory 1350, including computer program instructions or code, a transceiver 1360, an antenna 1370, and manager module 1380. There is no requirement that every network management device be so equipped. For example, the network management device can be equipped for wired communication only and consequently may not include antenna 1370.

The transceiver 1360 can be a transmitter, a receiver, both a transmitter and a receiver, or a unit that is configured both for transmission and reception. The transceiver 1360 can be coupled to corresponding one or more antenna(s) 1370, which may include a directional antenna. As noted above, the antenna can be omitted in certain embodiments.

The at least one processor 1340 can be variously embodied by any computational or data processing device, such as a central processing unit (CPU) or application specific integrated circuit (ASIC). The at least one processor 1340 can be implemented as one or a plurality of controllers.

The at least one memory 1350 can be any suitable storage device, such as a non-transitory computer-readable medium. For example, a hard disk drive (HDD) or random access memory (RAM) can be used in the at least one memory 1350. The at least one memory 1350 can be on a same chip as the corresponding at least one processor 1340, or may be separate from the corresponding at least one processor 1340. The memory 1350 can include at least one database.

The computer program instructions may be any suitable form of computer program code. For example, the computer program instructions may be a compiled or interpreted computer program.

The at least one memory 1350 and computer program instructions can be configured to, with the at least one processor 1340, cause a hardware apparatus (for example, network management device 1310) to perform a process, such as any of the processes described herein (see, for example, FIGS. 1 and 3-12).

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The manager module 1380 can be separate device configured to operate in connection with the processor 1340 and memory 1350 or can be implemented by, for example, configuring the processor 1340 to perform one or more routines stored in memory 1350.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY OF ABBREVIATIONS

BTS Base Station
CDDe Cell Degradation Detection
CDDi Cell Degradation Diagnosis
CDR Cell Degradation Recovery
COC Cell Outage Compensation
COD Cell Outage Detection
COR Cell Outage Recovery
CPE Customer Premise Equipment
CM Configuration Management
DM Domain Management
DLS Digital Subscriber Line
EM Element Management
FCAPS Fault, Configuration, Accounting, Performance, Security Management
GPS Global Positioning System
HSPA High-Speed Packet Access
ICIC Inter-Cell Interference Coordination
KPI Key Performance Indicator
MDT Minimization of Drive Tests
MIMO Multiple Input Multiple Output
NE Network Element
NM Network Management
OAM Operation, Administration and Maintenance
PCI Physical Cell ID
PM Performance Management
RACH Random Access Channel
RAT Radio Access Technology
SON Self-Organizing Networks
UE User Equipment

We claim:

1. A method, comprising:
   self-healing at least one first cell in a network or at least one second cell in the network, the network comprising the at least one first cell and the at least one second cell, wherein the at least one first cell and the at least one second cell have at least partially overlapping coverage,
   wherein the self-healing comprises a network device applying multi-layer reasoning based on a heterogeneous network having a plurality of cells being different from one another with respect to at least one of coverage area and radio access technology type to integrate information of different cell layers and sub-cell level reasoning to consider fine-granular location information, and
   wherein the self-healing is based on location information.

2. The method of claim 1, wherein the sub-cell level reasoning comprises processing network measurements.

3. The method of claim 1, wherein the sub-cell level reasoning is applied to at least one of sub-cell level detection, sub-cell level diagnosis, and sub-cell level recovery.

4. The method of claim 1, wherein the multi-layer reasoning is applied to at least one of multi-layer diagnosis and multi-layer recovery.

5. The method of claim 1, wherein the self-healing further comprises at least one of cell degradation detection, cell degradation diagnosis, and cell degradation recovery.

6. The method of claim 1, wherein the self-healing is based on a tolerance of the location information.

7. The method of claim 1, wherein the self-healing comprises sub-cell-level restoration when a sub-cell-level fault is detected.

8. The method of claim 1, wherein the self-healing comprises comparing coverage of a macro-cell layer to coverage of a micro-cell layer.

9. The method of claim 1, wherein the self-healing comprises compensating coverage or other characteristics of a layer of the larger cell based on information regarding a layer of the smaller cell or compensating coverage or other characteristics of the layer of the smaller cell based on information regarding the layer of the larger cell.

10. The method of claim 1, wherein the multi-layer reasoning includes inter-cell diagnosis, intra-cell diagnosis, and intra-cell layer diagnosis.

11. The method of claim 1, wherein the self-healing is based on location information that includes relative location of at least one network element of a first layer with respect to at least one network element of a second layer.

12. The method of claim 1, wherein the self-healing is based on location information that includes relative location of at least one network element of a layer with respect to at least one other network element of the layer.

13. A non-transitory computer readable medium encoded with instructions that, when executed in hardware, perform a process, the process comprising a method according to claim 1.

14. An apparatus, comprising:
- at least one processor; and
- at least one memory including computer program instructions, wherein the at least one memory and the computer program instructions are configured to, with the at least one processor, cause the apparatus at least to self-heal at least one first cell in a network or at least one second cell in the network, the network comprising the at least one first cell and the at least one second cell, wherein the at least one first cell and the at least one second cell have at least partially overlapping coverage, and to apply multi-layer reasoning to integrate information of different cell layers and sub-cell level reasoning based on a heterogeneous network having a plurality of cells being different from one another with respect to at least one of coverage area and radio access technology type to consider fine-granular location information, and
- wherein the self-healing is based on location information.

15. The apparatus of claim 14, wherein the sub-cell level reasoning is applied to at least one of sub-cell level detection, sub-cell level diagnosis, and sub-cell level recovery.

16. The apparatus of claim 14, wherein the at least one memory and the computer program instructions are configured to, with the at least one processor, cause the apparatus at least to perform degradation detection, cell degradation diagnosis, and cell degradation recovery.

17. The apparatus of claim 14, wherein the at least one memory and the computer program instructions are configured to, with the at least one processor, cause the apparatus at least to base self-healing on a tolerance of the location information.

* * * * *